Jan. 5, 1971          W. C. DEEM          3,552,747
PORTABLE FOLDING FERRIS WHEEL
Filed Feb. 6, 1969          18 Sheets-Sheet 4
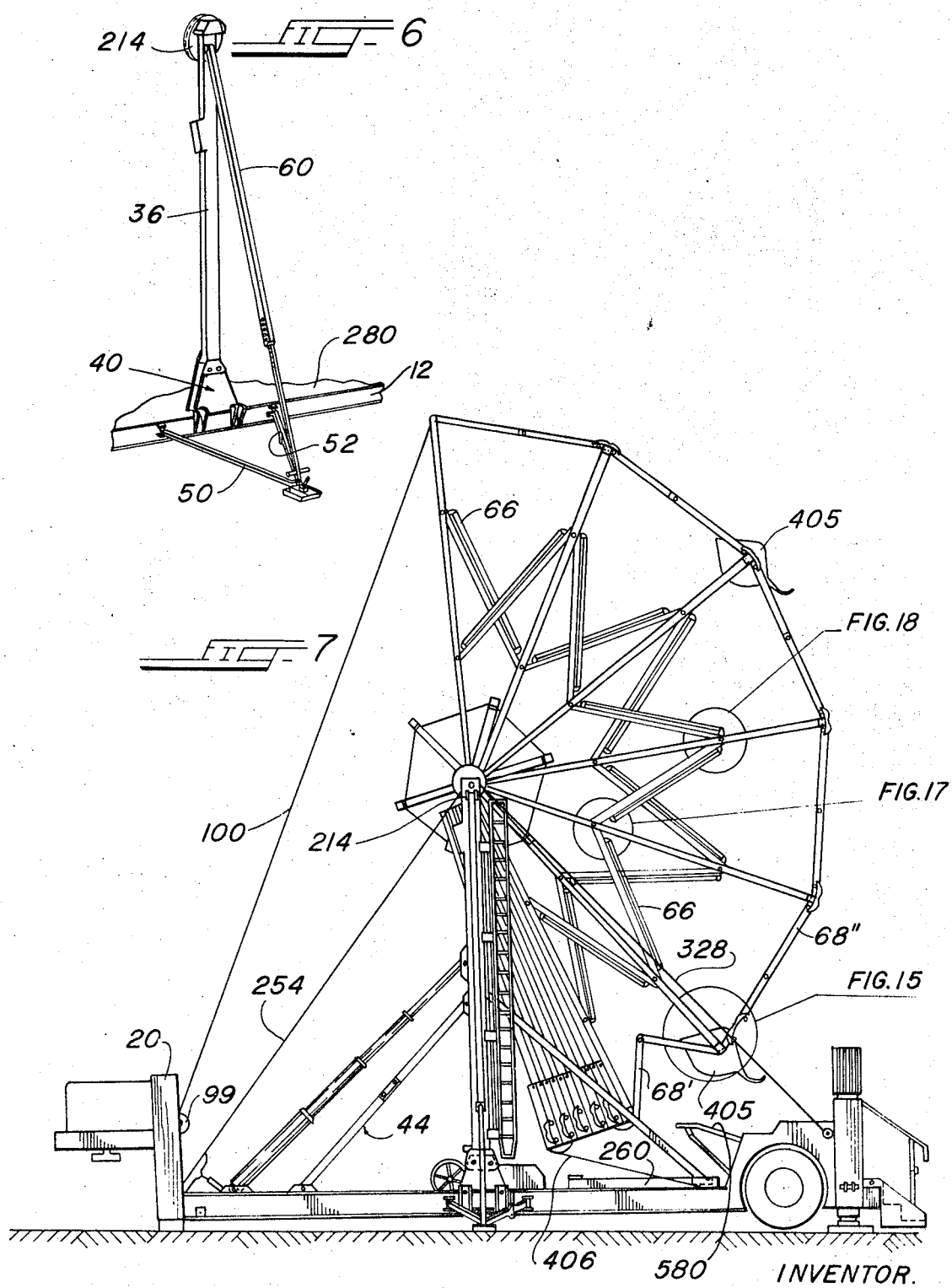
INVENTOR.
WILLIAM C. DEEM
BY Rummler & Snow
TITUS

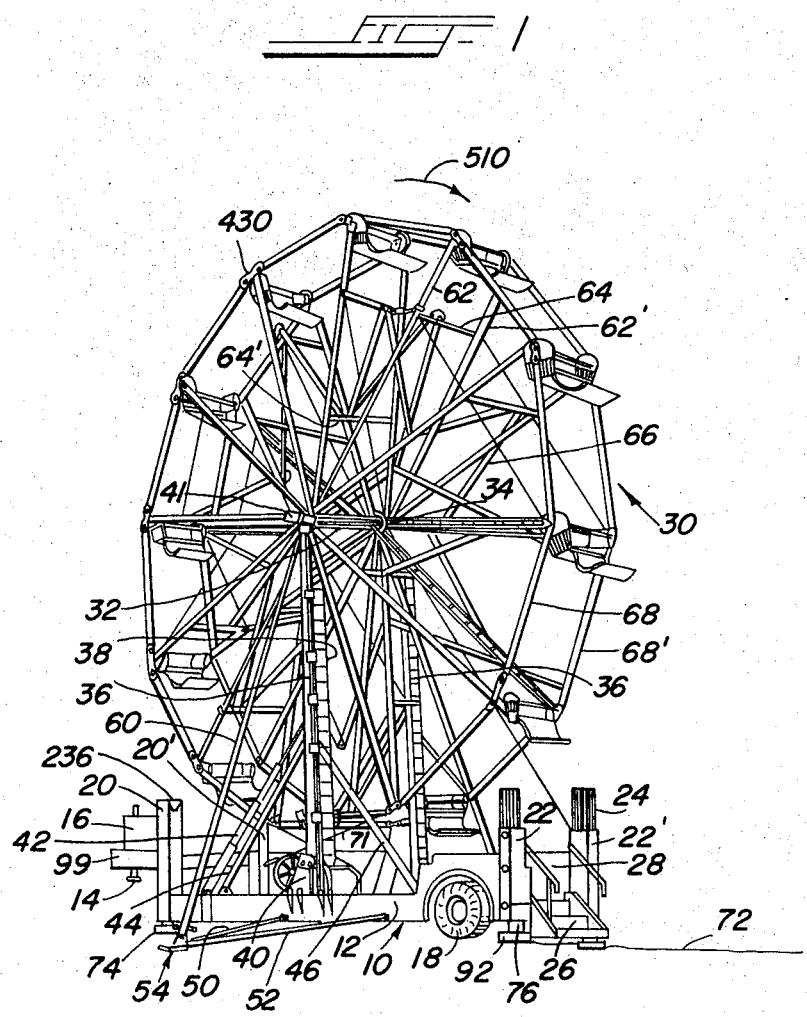

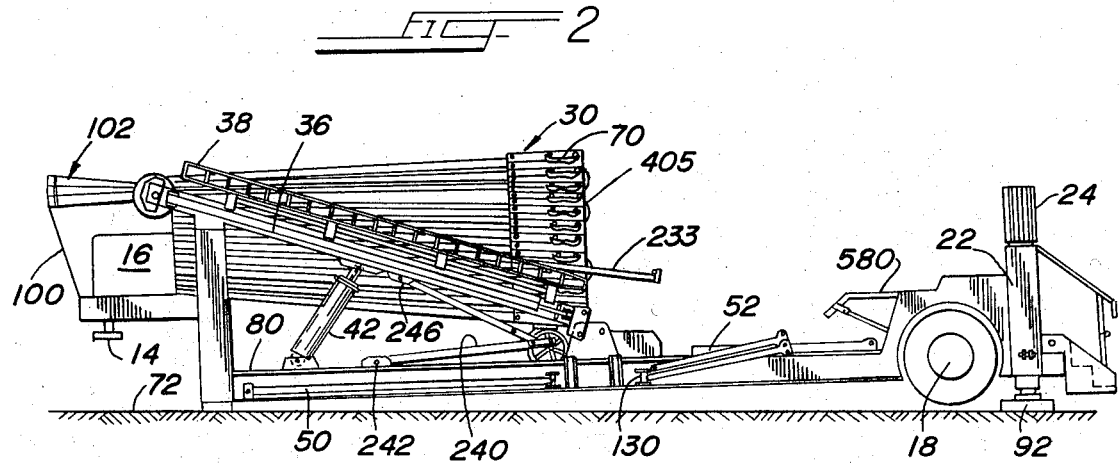
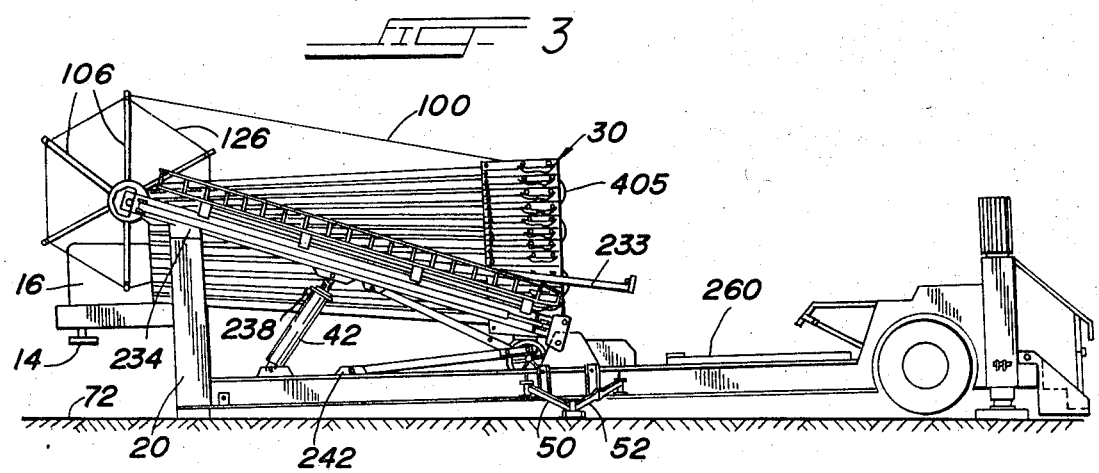
INVENTOR.
WILLIAM C. DEEM

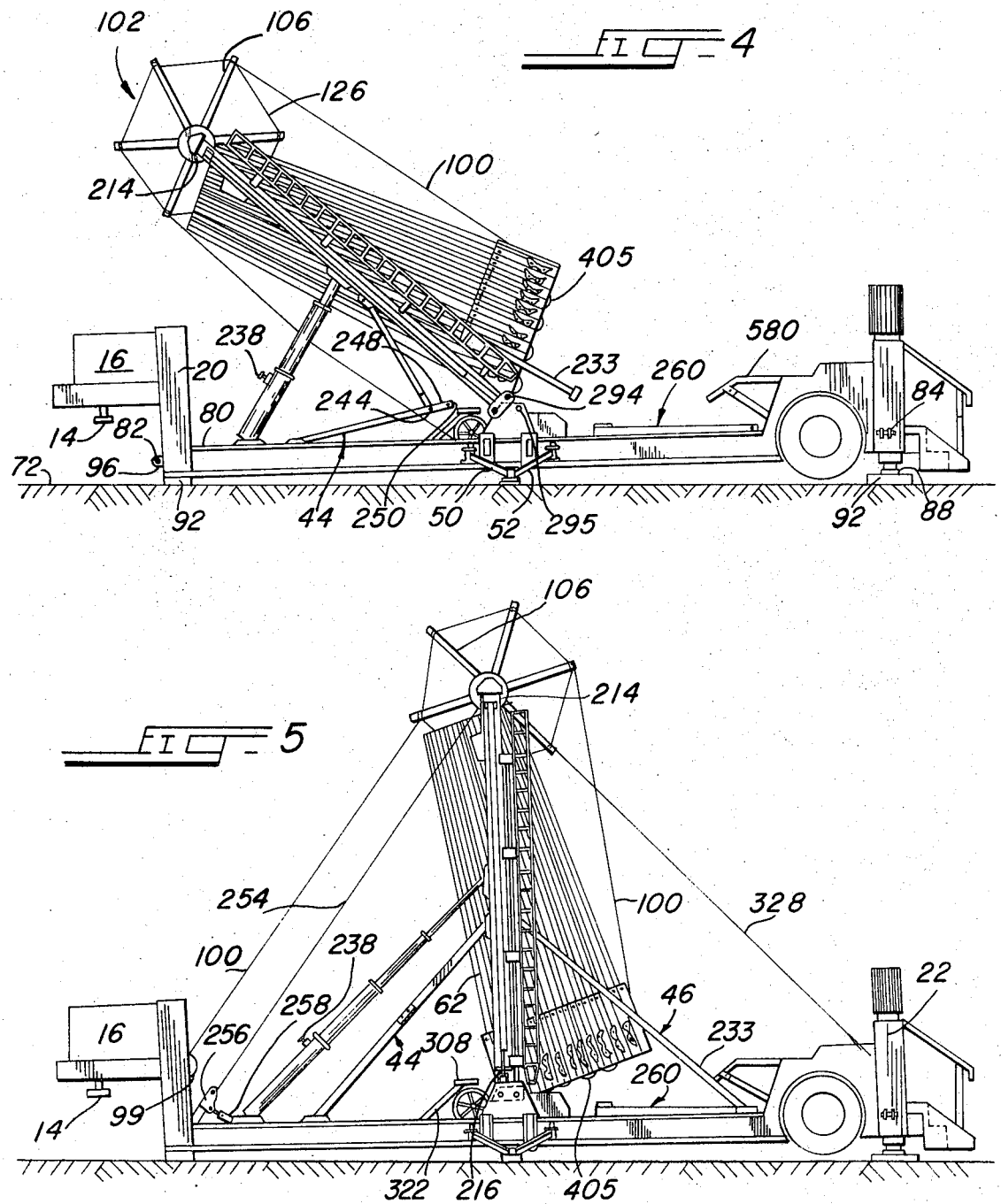

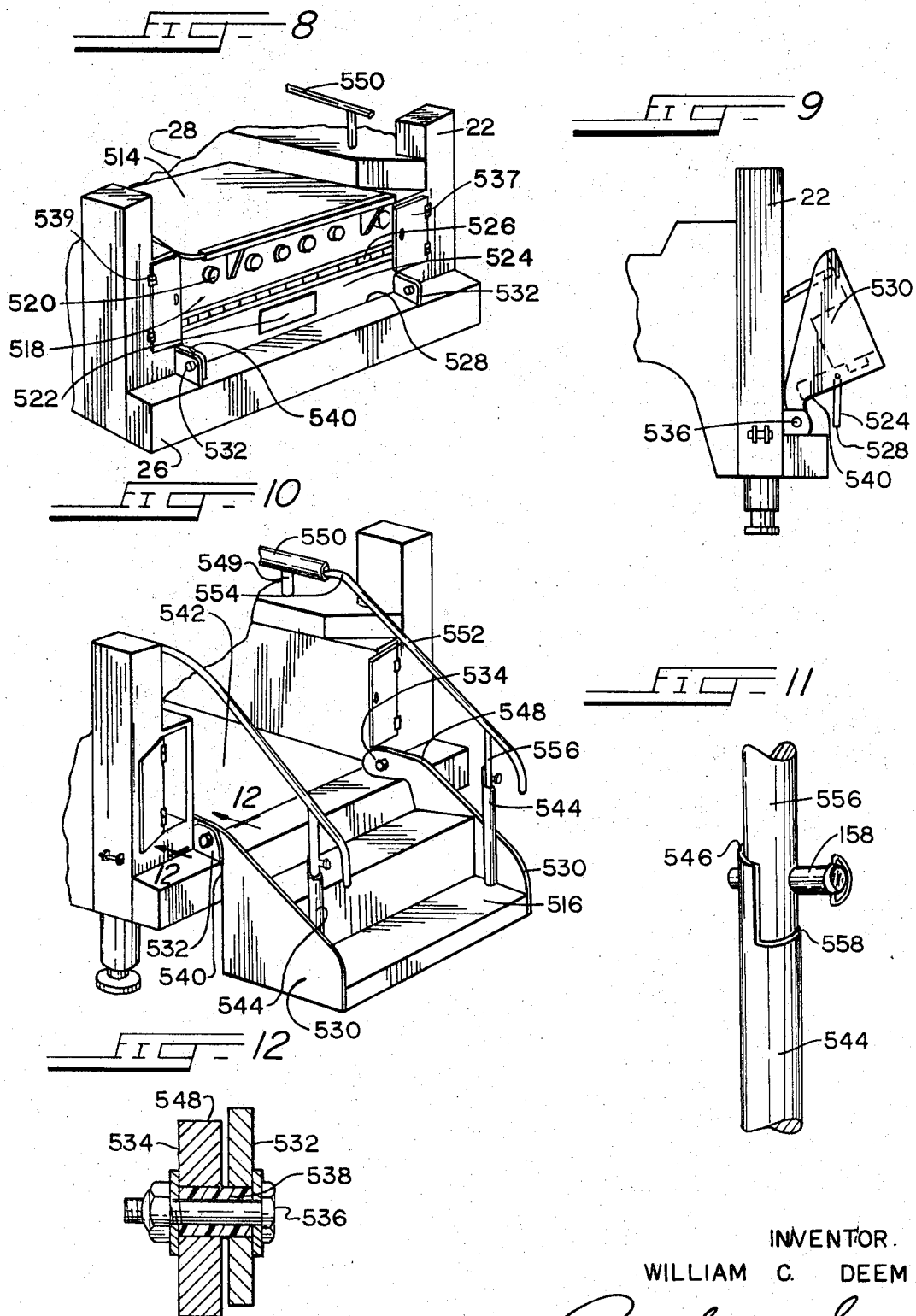

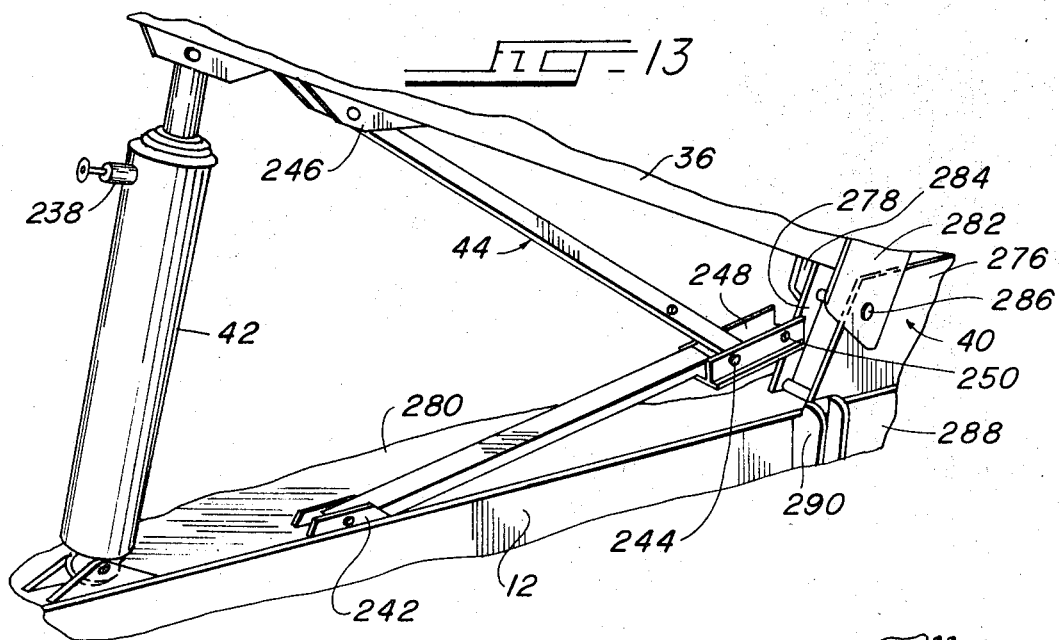
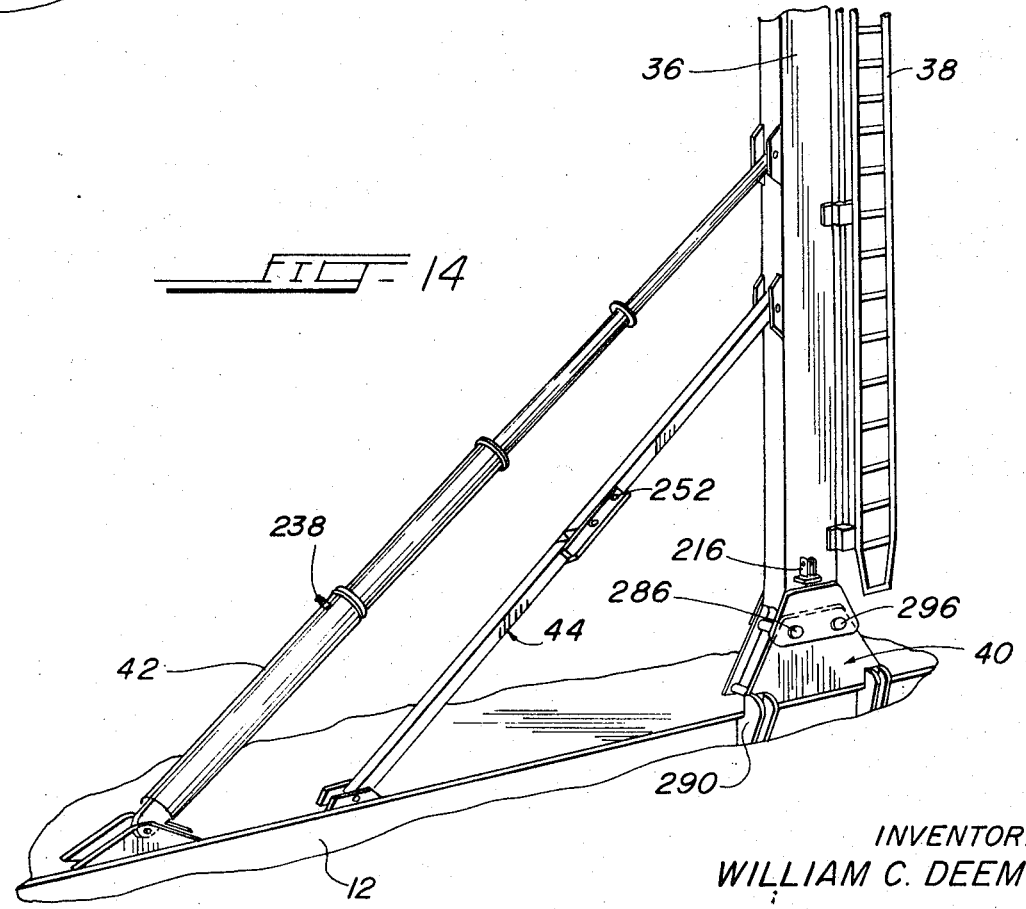

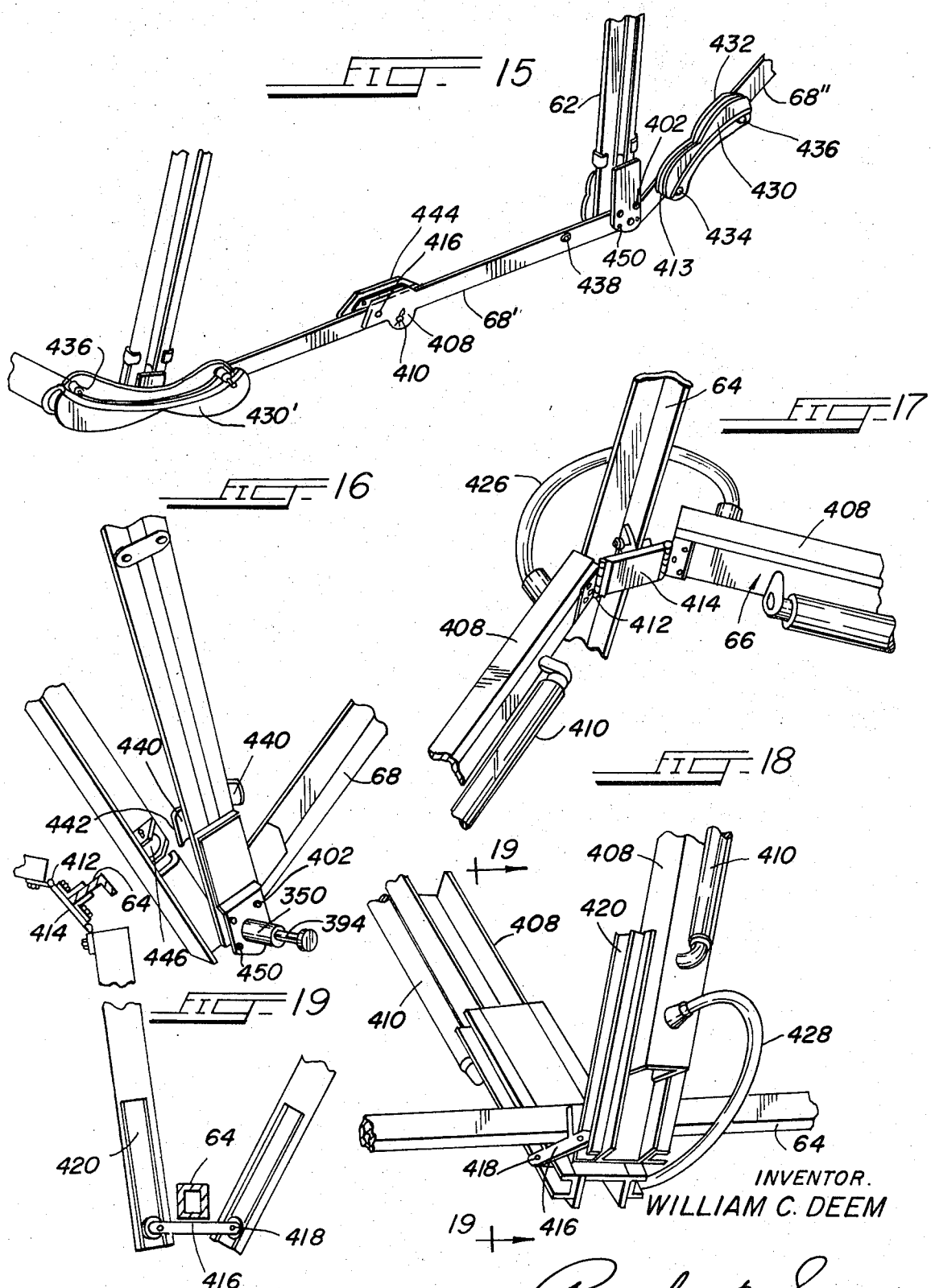

Jan. 5, 1971 W. C. DEEM 3,552,747
PORTABLE FOLDING FERRIS WHEEL
Filed Feb. 6, 1969 18 Sheets-Sheet 8
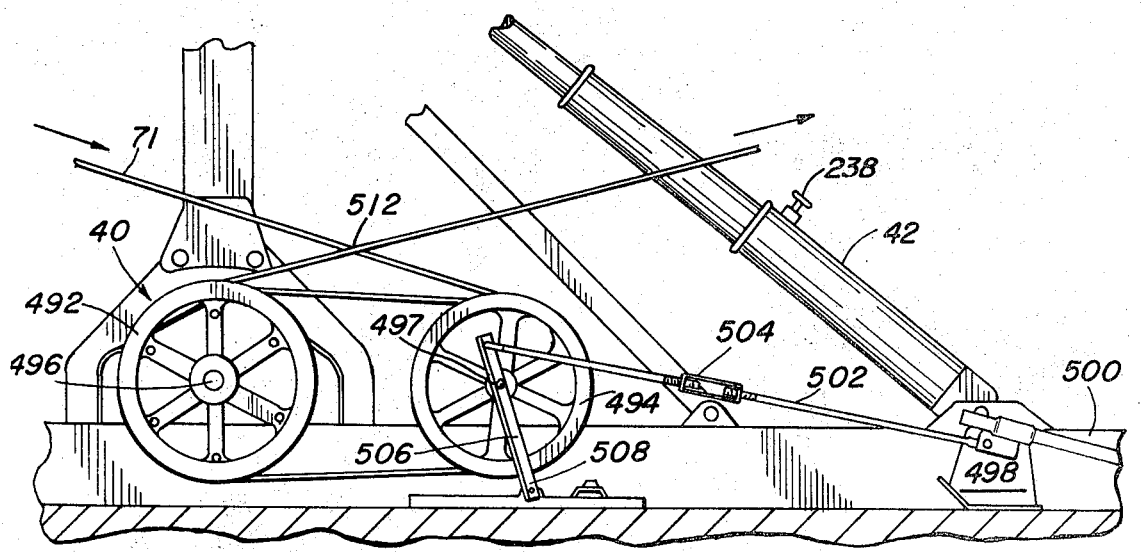
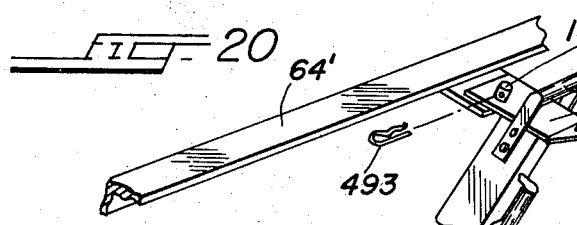
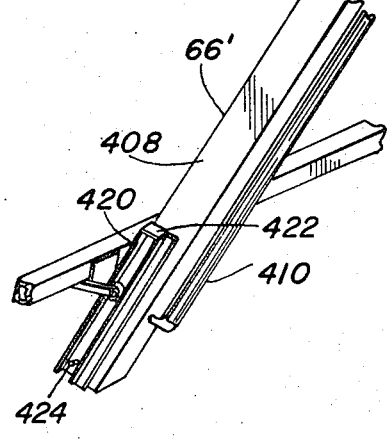
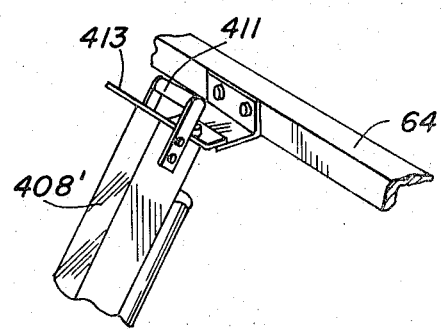
INVENTOR.
WILLIAM C. DEEM

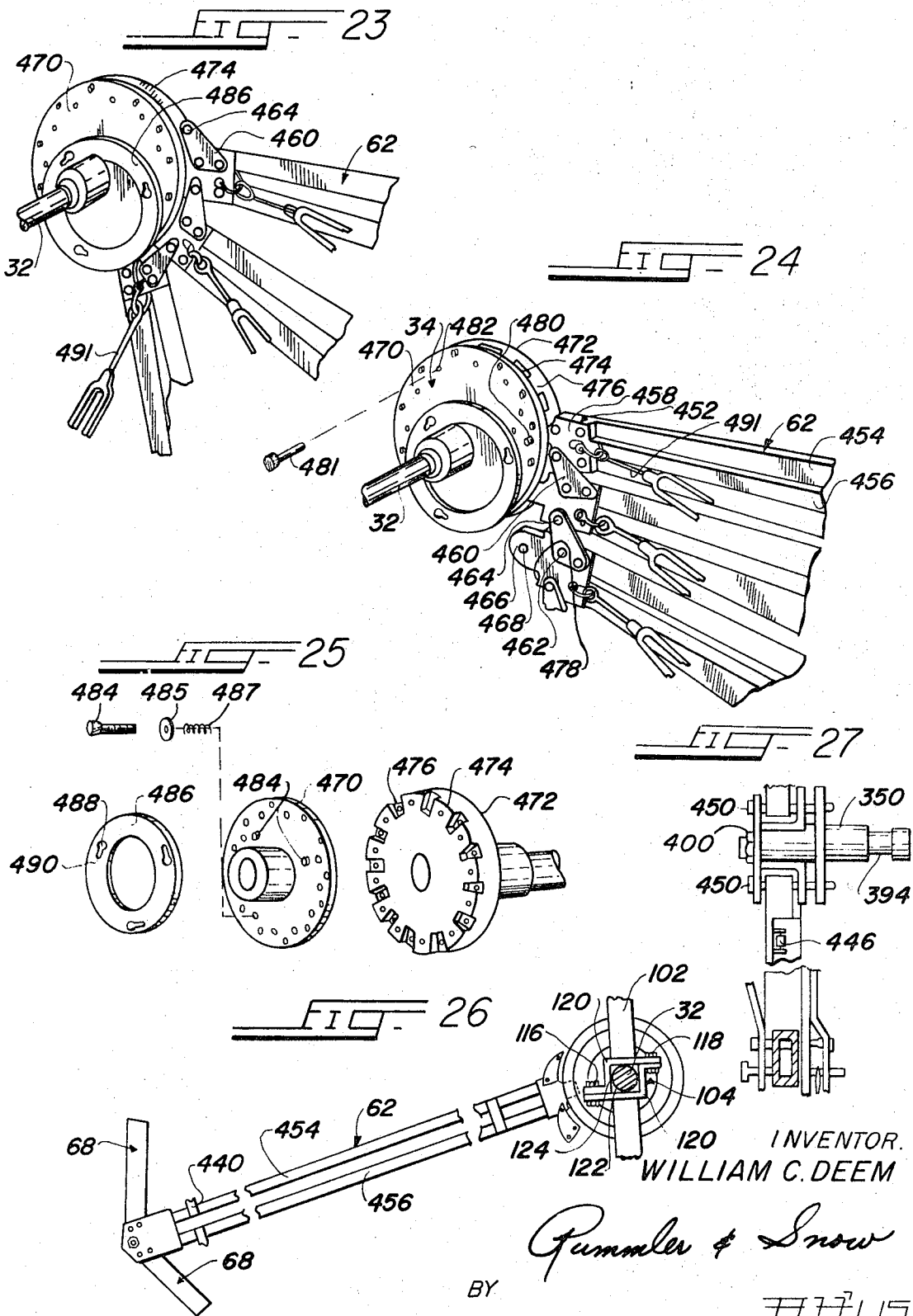

Jan. 5, 1971 W. C. DEEM 3,552,747
PORTABLE FOLDING FERRIS WHEEL
Filed Feb. 6, 1969 18 Sheets-Sheet 10
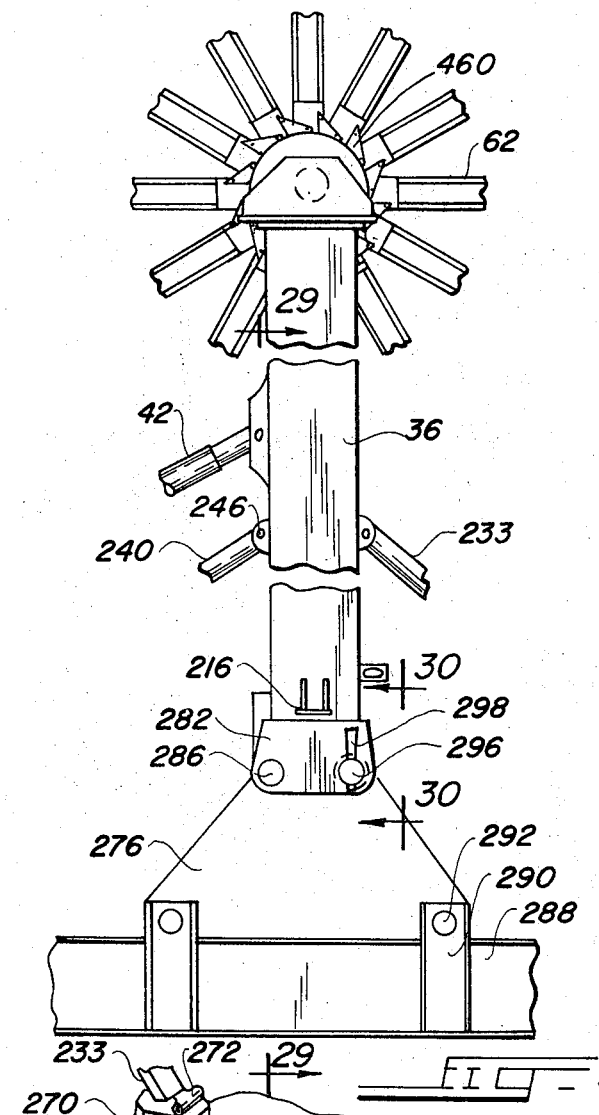
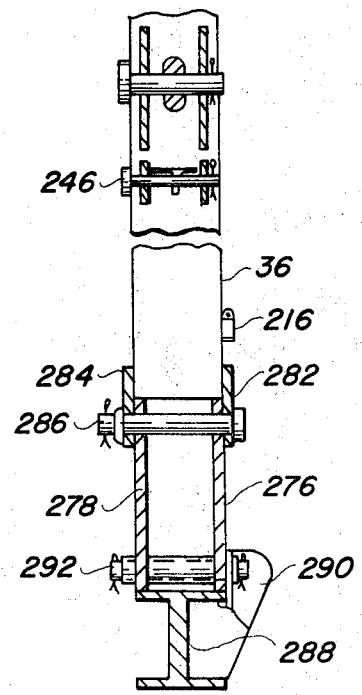
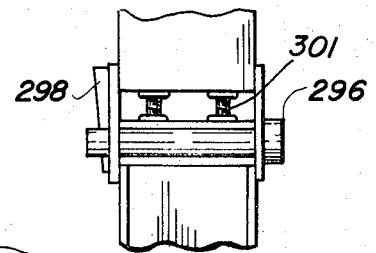
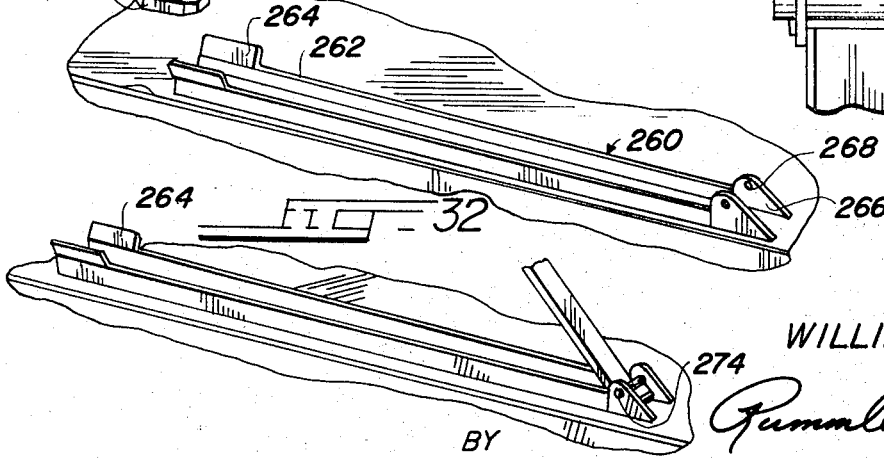
INVENTOR:
WILLIAM C. DEEM
BY Pummler & Snow
ATTYS

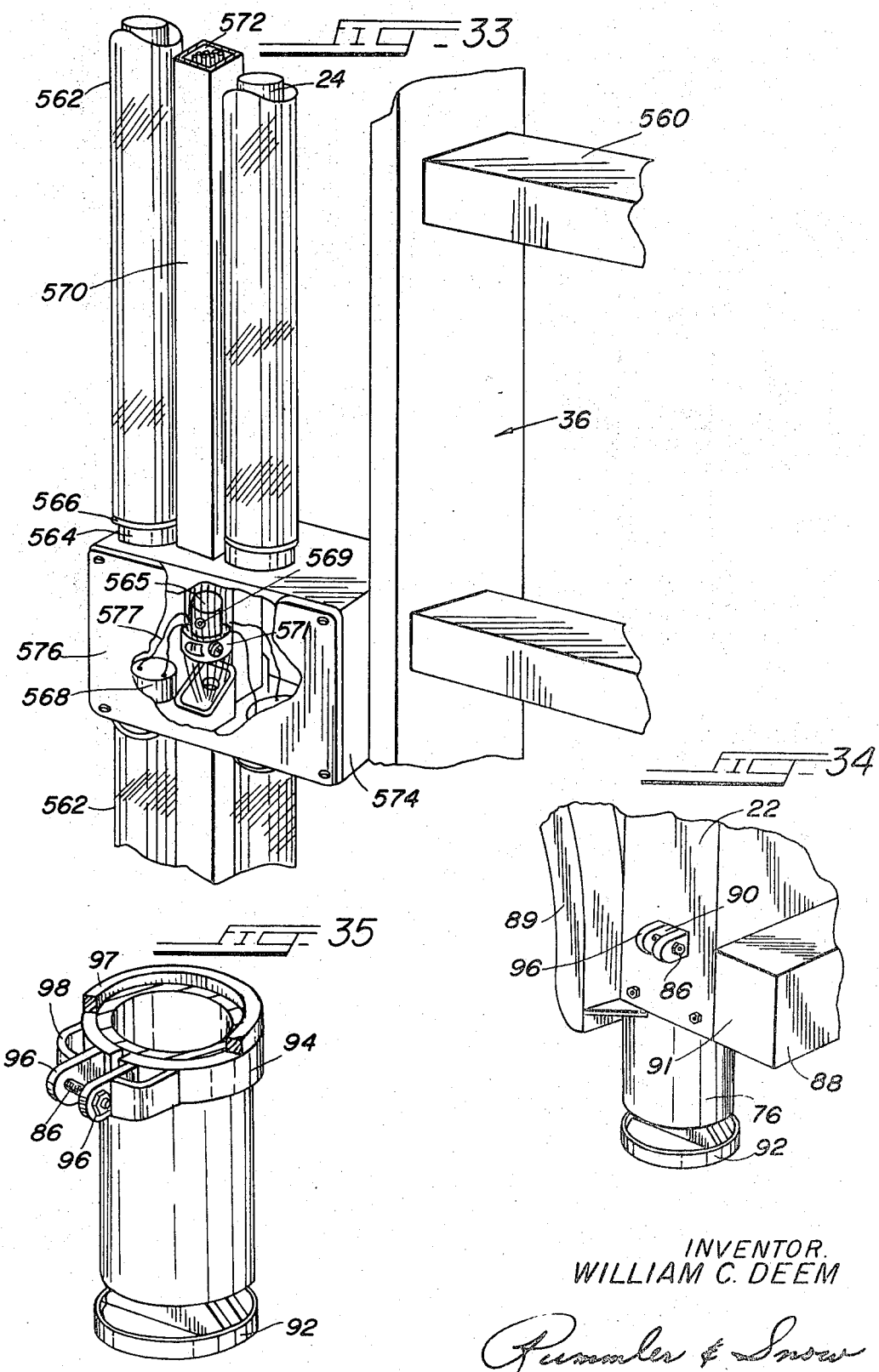

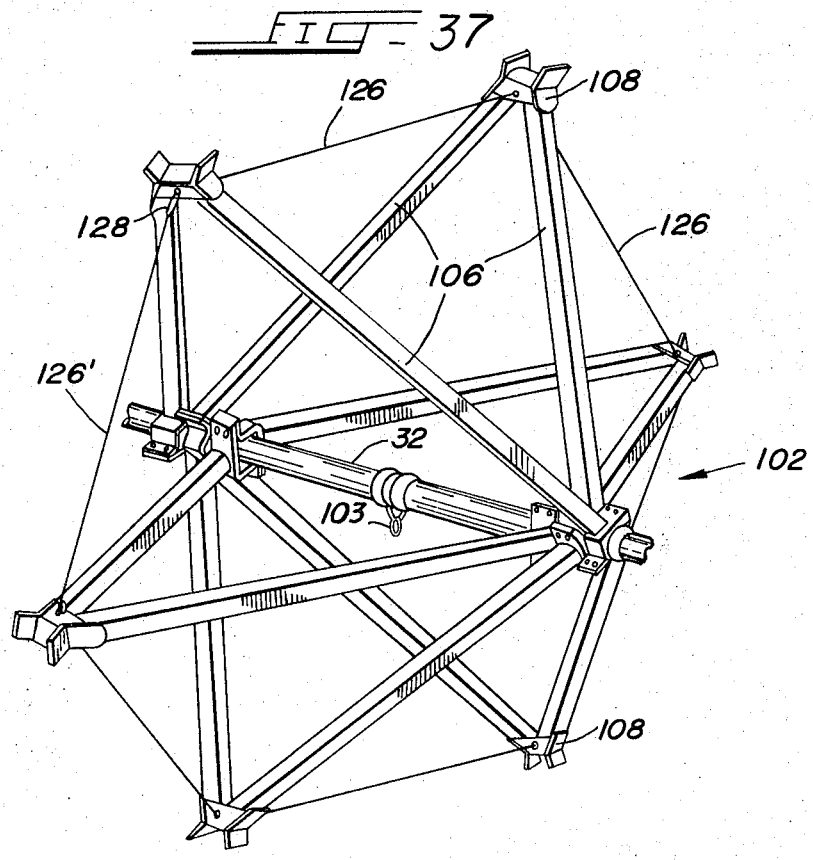
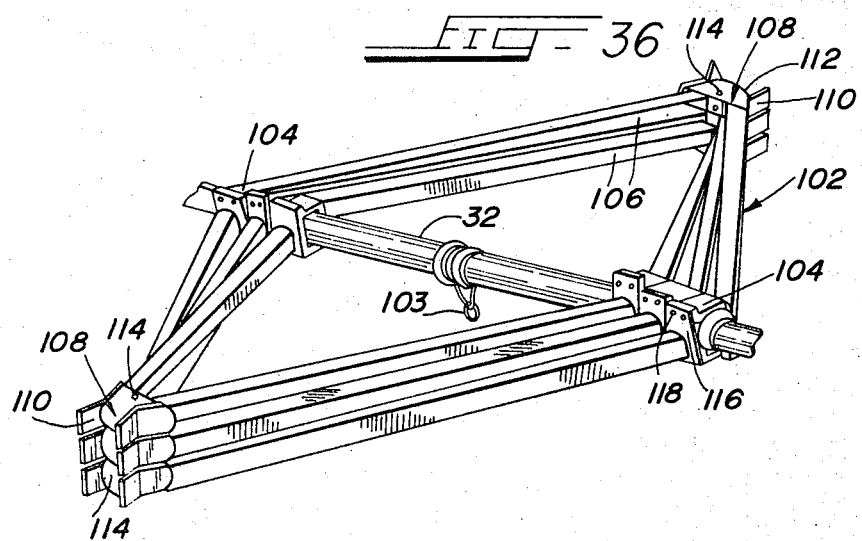

Jan. 5, 1971  W. C. DEEM  3,552,747
PORTABLE FOLDING FERRIS WHEEL
Filed Feb. 6, 1969  18 Sheets-Sheet 13
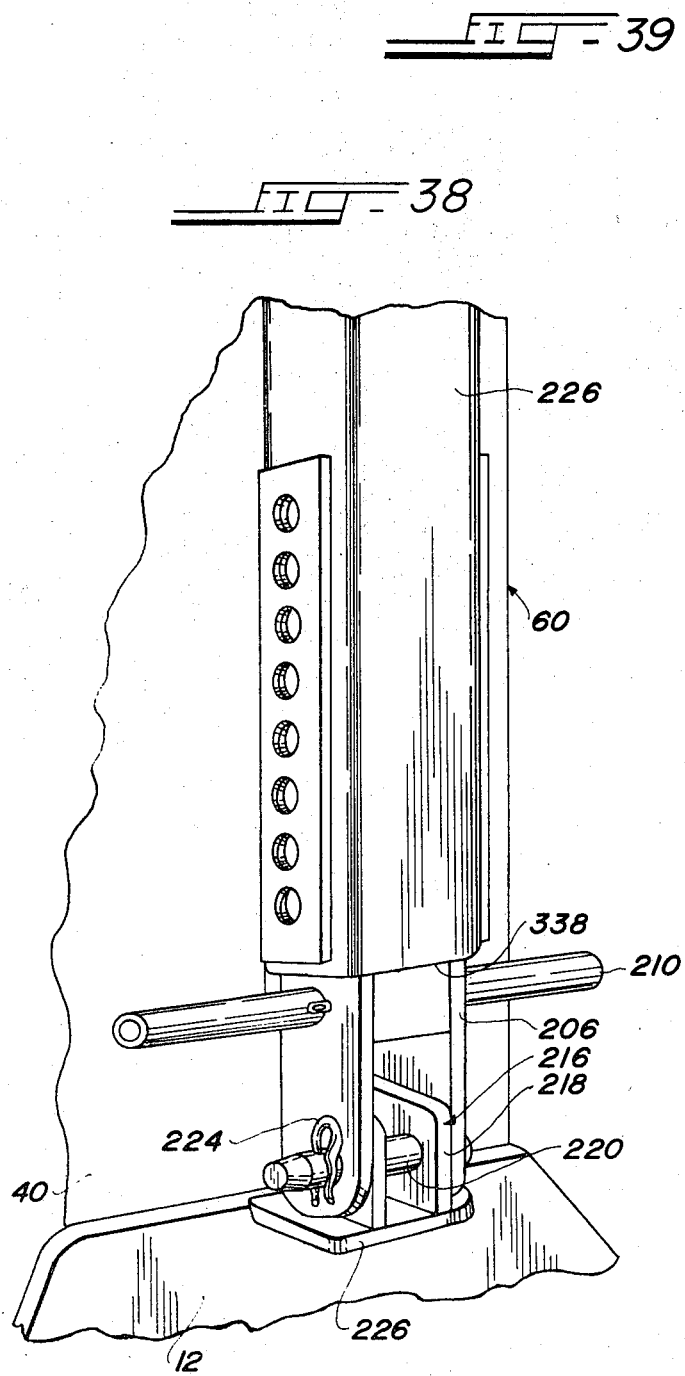
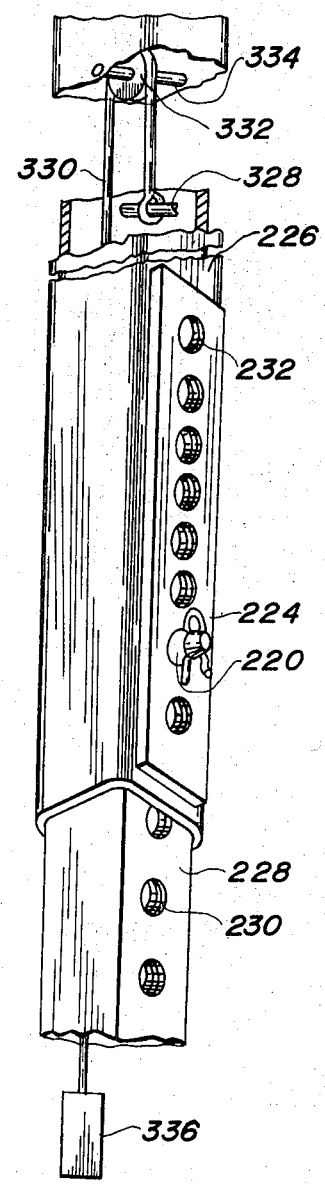
INVENTOR.
WILLIAM C. DEEM Jan. 5, 1971 W. C. DEEM 3,552,747
PORTABLE FOLDING FERRIS WHEEL
Filed Feb. 6, 1969 18 Sheets-Sheet 14
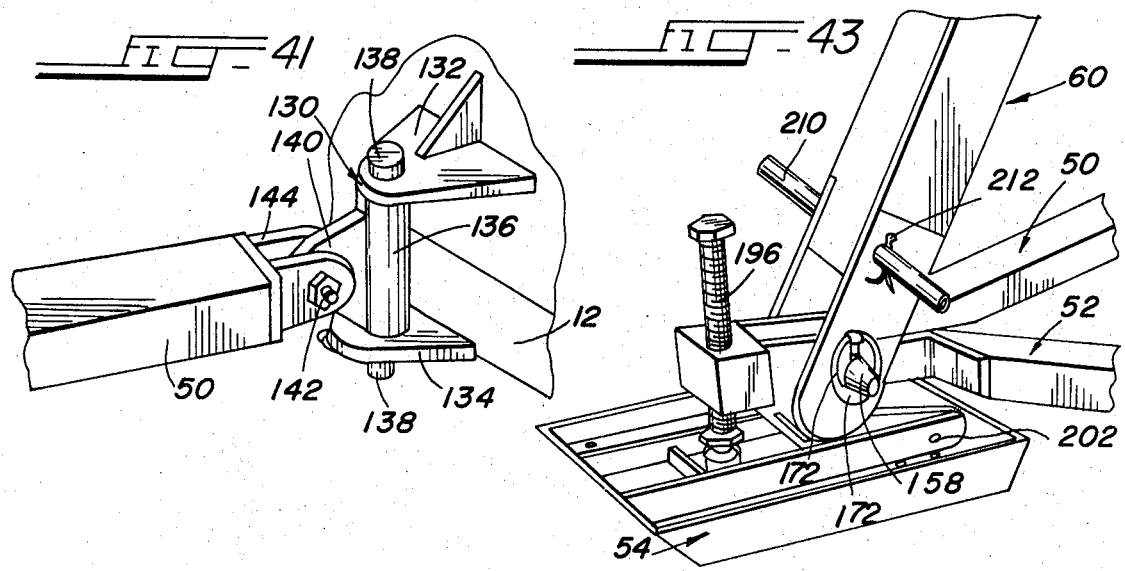
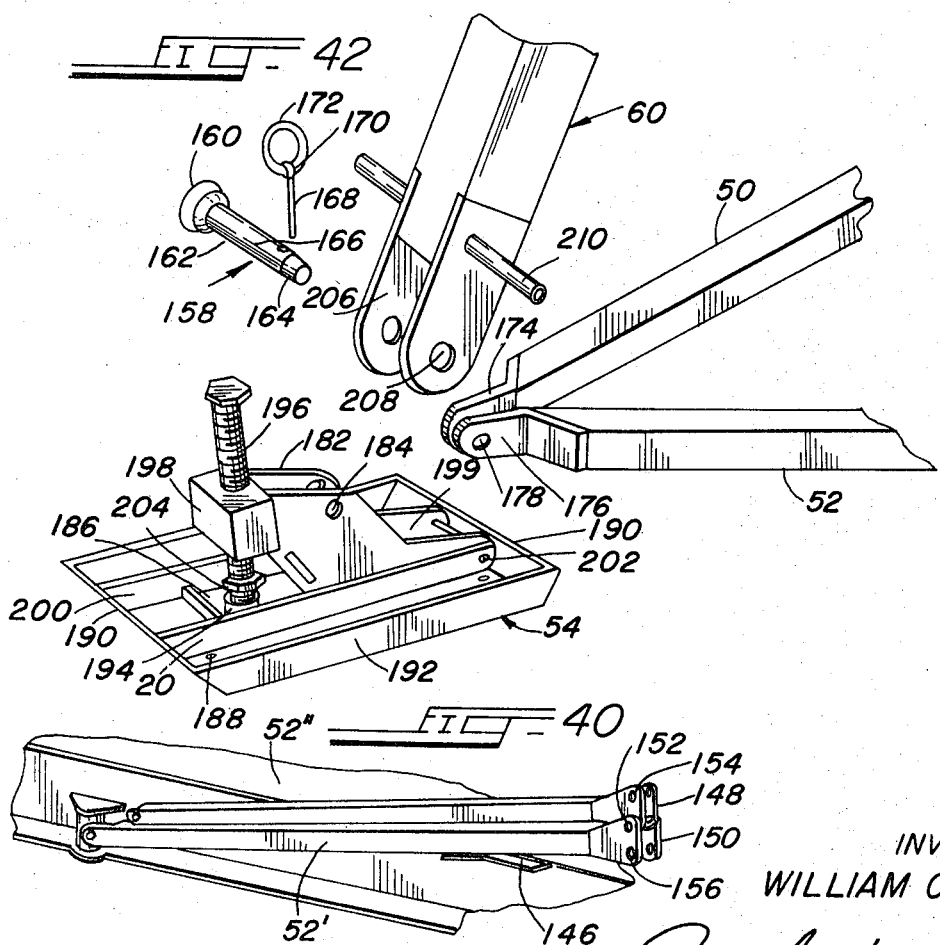
INVENTOR.
WILLIAM C. DEEM
BY Rummler & Snow
ATTYS.

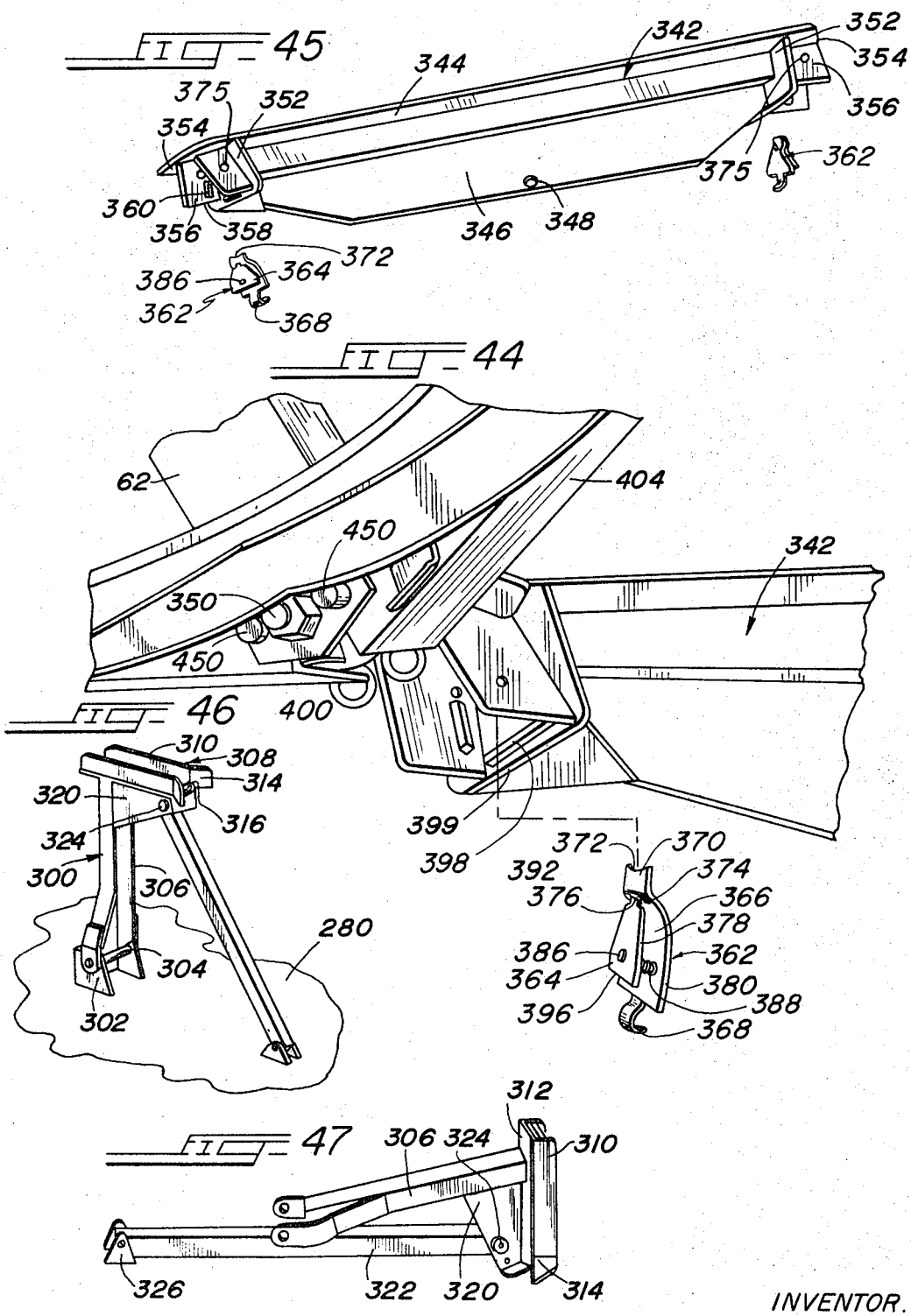

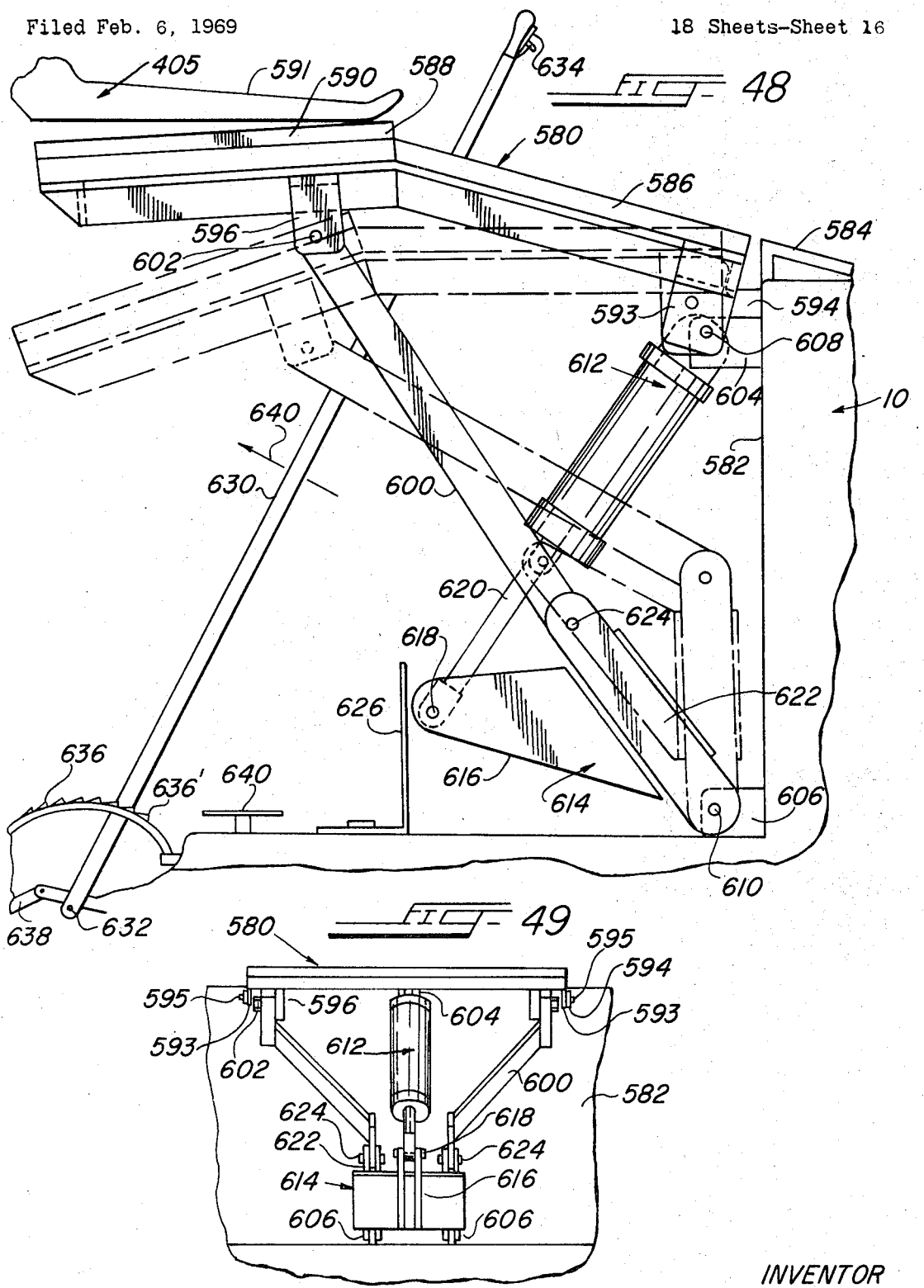

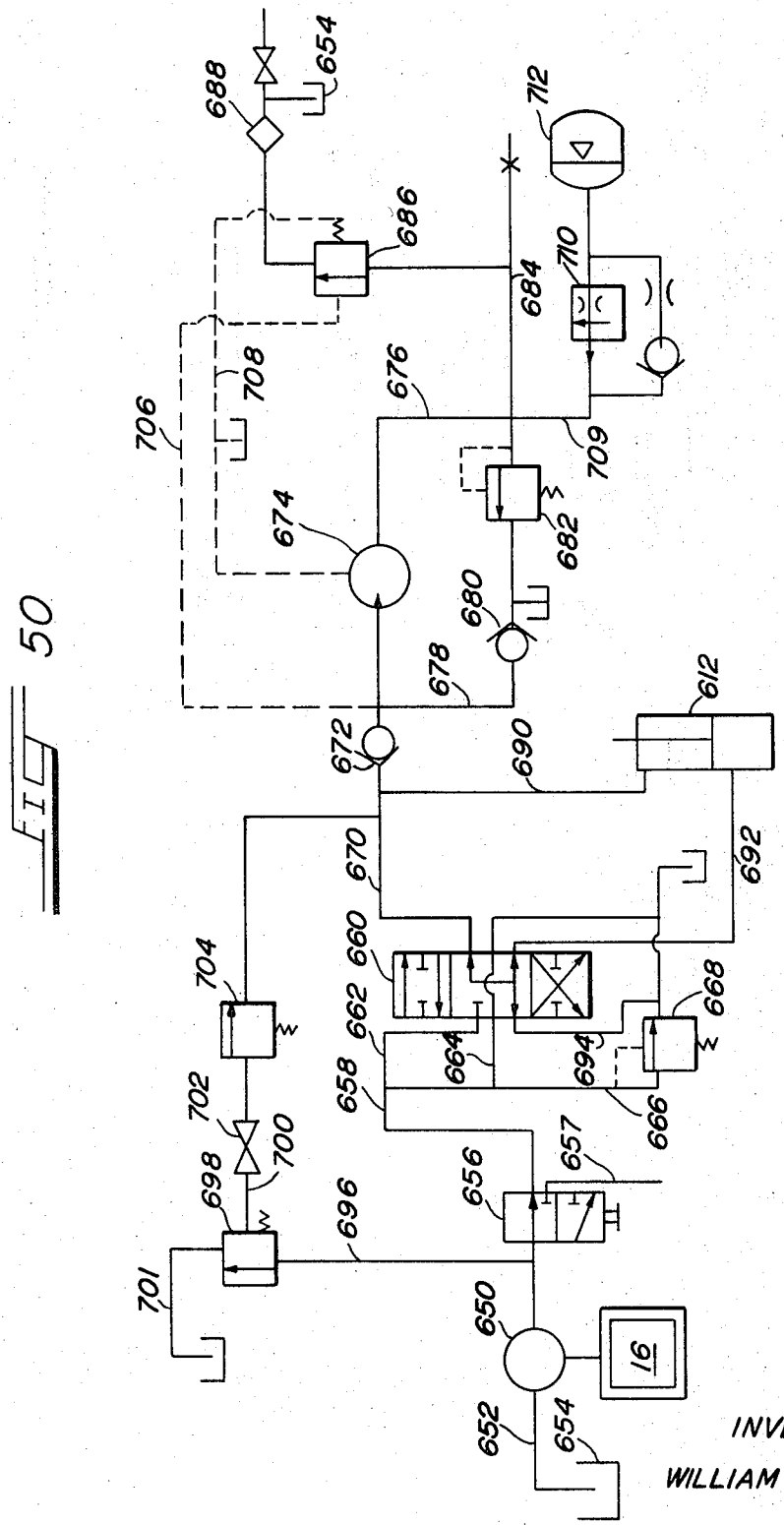

Jan. 5, 1971  W. C. DEEM  3,552,747
PORTABLE FOLDING FERRIS WHEEL
Filed Feb. 6, 1969  18 Sheets-Sheet 18
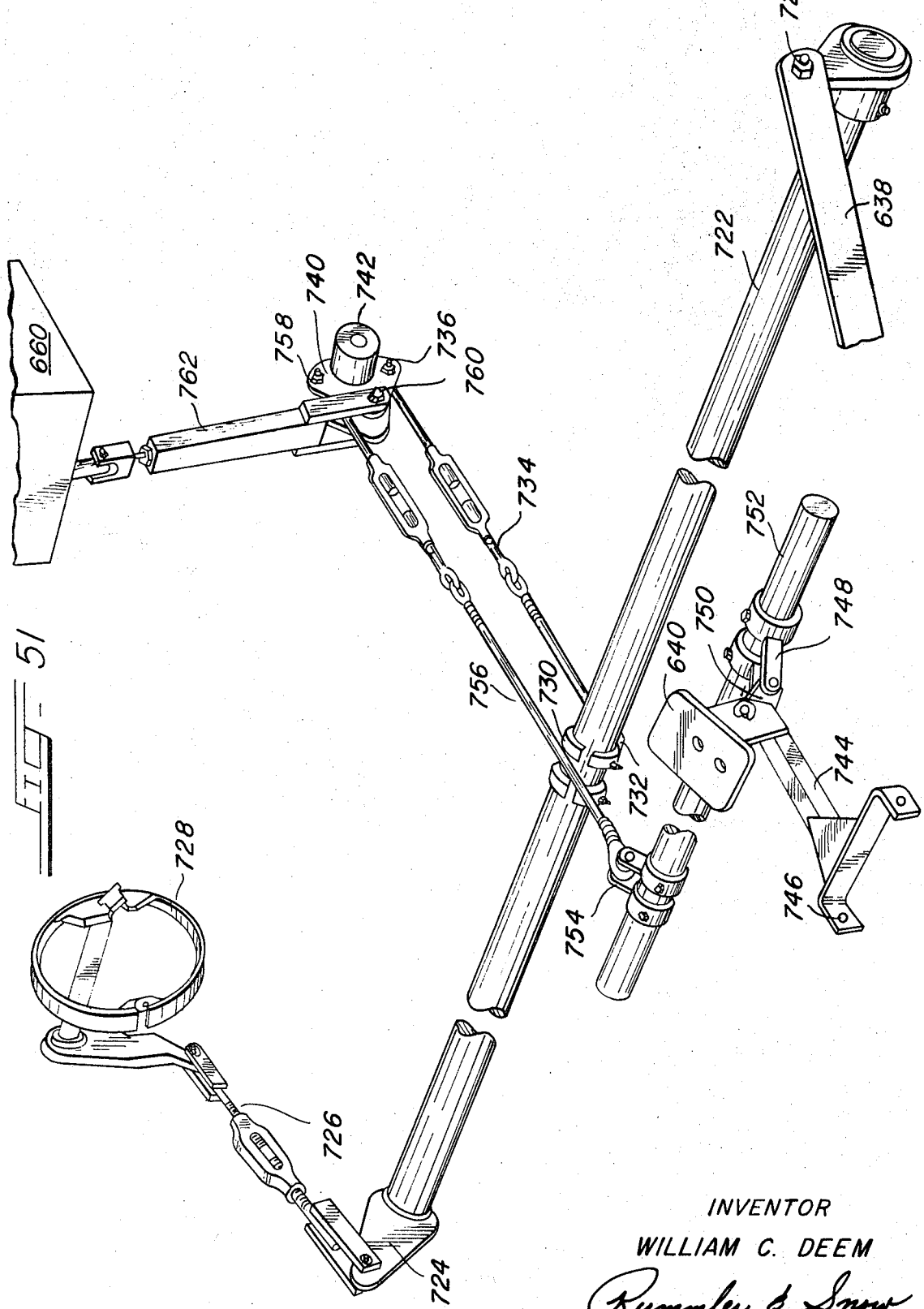
INVENTOR
WILLIAM C. DEEM
BY Rummler & Snow

United States Patent Office 3,552,747
Patented Jan. 5, 1971

3,552,747
PORTABLE FOLDING FERRIS WHEEL
William C. Deem, Jacksonville, Ill., assignor to Eli Bridge Company, Jacksonville, Ill., a corporation of Illinois
Filed Feb. 6, 1969, Ser. No. 797,159
Int. Cl. A65g 1/00
U.S. Cl. 272—29
28 Claims

ABSTRACT OF THE DISCLOSURE

The disclosure describes a mobile full scale unit characterized by base-pivoted main support members with automatic locking diagonal braces supporting the main axle, spaced hub members about the axle having slotted radial sections, an inner derrick wheel on the axle which has rotatable diametric members adapted to be pivoted into a radially spaced position and held by cable segments, adjustable frictional hub members supporting the derrick wheel, a collapsible ferris wheel comprising a plurality of opposed spoke sections joined with hinged cross braces and hinged outer rim members, the wheel being carried on the axle through cleats which engage the slotted hub sections in sequence during unfolding, disengage in the opposite direction during the folding and a retainer ring and pin combination in the hub to hold the center of the assembled wheel securely. A single prime mover is used to raise the support members, pull the ferris wheel into its fanned-out position around and by means of the derrick wheel, drive the ferris wheel once it is assembled and also collapse the ferris wheel into a transportable compact arrangement on the mobile unit. Other embodiments are disclosed.

BACKGROUND OF THE INVENTION

A wide variety of moving rides are provided for amusement parks and fairs. These devices generally depend upon a plurality of rotating members which carry seated passengers in a circular and sometimes undulating path. Such structures must be entirely safe during assembly and operation and it is highly desirable that they be easily portable since most such installations are temporary in nature. Experience has developed certain time proven design features and structural relationships in these devices which impart strength, reliability, lightness in weight, and some ease of assembly. Generally a crew of men is required for the assembly of a ride capable of holding a dozen or more persons. Rides of this size in the past have been composed of a large number of individual structural members which must be handled individually and completely disassembled and again assembled when used at various locations. It is not always possible to design these structures so that the parts may be nested or packed efficiently upon the trailer. Some orientation as to the placement of the parts on the trailer to the end use has been developed to facilitate their use. Ease of assembly of these ride devices is increased by employing sub-assemblies of several parts which reduce the number of separate parts to be handled. However, as the size of the ride increases the size and weight of both the individual structural parts and the sub-assemblies also increases. Also there is the problem of orientation of the sub-assemblies in accordance with the end use which is magnified with the increase in the size of the unit. The elimination of the number of joints or fitments that must be fixed by bolts or pins to hold the entire assembly together without sacrifice of safety is not always possible. For these reasons most if not all moving rides of reasonable capacity are cumbersome to handle, and require considerable time and manpower in their assembly, use and disassembly.

A riding device of the size of a ferris wheel being an upright structure of considerable height with a capacity of 24 to 36 people presents additional problems of structure and strain as a permanent installation over those of a surface ride. These are magnified when the wheel is designed to form a portable and folding unit. In the design of such a unit it is necessary that means be provided to securely place the unit upon the ground taking into consideration that the ground surface may become softened. Also the unit must be leveled and balanced in order to operate with security and pleasure to the riders. Precautions must be taken against the possibility of strong winds and also for the safety of the men assembling and operating the ferris wheel.

The instant invention provides a portable folding ferris wheel attached to and carried by a semi-trailer meeting the regulations of the Interstate Commerce Commission which carries 12 standard all-steel passenger seats for a total capacity of 24–36 passengers, and is readily and safely assembled, operated and disassembled by one or two men.

SUMMARY OF THE INVENTION

The portable folding ferris wheel of this invention combines and retains certain of the time-proven design features and reliability of standard ferris wheels into a foldable unit carried by and supported from a self-contained semi-trailer with certain built-in labor and time saving features. The ferris wheel of this invention can be quickly and easily erected for operation or dismantled for moving to a new location by two men. A feature of the invention is the circumferentially folding or fanning derrick wheel which acts as a fulcrum or continuous lever both during the unfolding and folding of the main wheel. Another feature is the separable hub member of the wheel and the cooperating cleats on the wheel spokes which fold and unfold radially into registry with each other and are pinned together with pins and locked by a retainer ring. The retainer ring or collar provides positive retention and quick release of the hub pins. Supports are provided to hold the folded parts to the trailer during transportation and the supports themselves fold out of the way while the wheel is in service. Positive longitudinal and lateral rigidity of the assembled unit are assured by self-adjusting and automatically positioned braces.

All of the heavy work is carried out by a prime mover through hydraulic means and those members which can not be so operated are counter-balanced in such a manner that one man can move any necessarily heavy brace members into position with ease and safety. The heaviest pieces handled are the seats for the passengers. Four of the seats remain attached to the wheel in its folded position. The ferris wheel is about 12 feet high in the folded condition and about 41 feet high in the unfolded condition and lies upon a 36 foot trailer with a 96 inch clearance width. The device incorporates a lighting assembly which folds with the wheel and is so arranged that only one electric connection need be made to put the assembly into operation. Passenger safety in entering and leaving the wheel is a primary consideration and is provided for by simplicity of controls, incorporating an automatic brake and means to prevent movement of the loading ramp while the wheel is turning. An over-riding mechanical brake is also provided. Provision is made for positive and finite adjustment of all controls for safe operation.

DESCRIPTION OF THE DRAWINGS

One embodiment of this invention is illustrated in the drawings, wherein,

FIG. 1 is a perspective view of the ferris wheel in the unfolded condition and ready for operation.

FIG. 2 is a side plan view of the ferris wheel in folded condition upon the trailer which is in a levelled position upon the ground.

FIG. 3 is a side elevational view showing the rotatable derrick wheel in the unfolded condition preparatory to erection of the main supports.

FIG. 4 shows the main support or tower members being moved toward the vertical position by hydraulic lifts.

FIG. 5 shows the tower members in the full vertical position and the diagonal braces in their proper positions.

FIG. 6 is a fragmentary view showing the wind brace and out-rigger on one side of the trailer in their assembled condition.

FIG. 7 is a side plan view showing the unfolding of the stacked spoke assembly of the ferris wheel by means of the derrick wheel.

FIG. 8 is a fragmentary perspective view of the rear of the trailer showing the passenger step assembly folded into position for traveling on the highway.

FIG. 9 is a fragmentary side elevational view showing the passenger step assembly being unfolded.

FIG. 10 is a fragmentary perspective view of the passenger step assembly unfolded and ready to receive passengers.

FIG. 11 is a fragmentary elevational view of the collapsible newel post for the step assembly.

FIG. 12 is across sectional view taken along lines 12—12 of FIG. 10 showing the details of the step hinge.

FIG. 13 is a fragmentary perspective view of one side of the trailer showing one of the telescoping hydraulic units and the folding diagonal knee brace as the towers are being moved to the upright position.

FIG. 14 is a fragmentary perspective view of one side of the trailer showing one of the telescoping hydraulic units in its extended position with the tower upright and the knee brace in its unfolded and locked position.

FIG. 15 is a fragmentary perspective view of the outer circumferential rim members at the end of the spoke members of one side of the wheel showing the folding and locking arrangement of the spaced cable drive rims.

FIG. 16 is a fragmentary perspective view of the outer end of a spoke member with the aligning cleat thereon to allow proper folding and unfolding at this juncture.

FIG. 17 is a fragmentary perspective view of the folding juncture of the inner braces of the ferris wheel in the unfolded condition and the electrical connections thereacross which remain connected in all positions of the juncture.

FIG. 18 is a fragmentary perspective view of a pair of telescoping light panels that can be extended to connect between the master spoke and the last spoke of the wheel.

FIG. 19 is a cross-sectional view taken along the lines 19—19 of FIG. 18 showing the roller mountings for the light panels.

FIG. 20 is a fragmentary perspective view of a telescoping light panel and its connection to a spoke cross bar.

FIG. 21 is a fragmentary perspective view of a telescoping light panel affixed to a cross brace in travel position.

FIG. 22 is a fragmentary side elevational view of the drive pulley and idler pulley shives for the rotation of the ferris wheel and also the adjusting links therefor.

FIG. 23 is a fragmentary perspective view of the hub assembly in the unfolded condition and before attachment of the retainer plate.

FIG. 24 is a fragmentary perspective view of the hub assembly as the spoke cleats engage same during folding or unfolding of the wheel.

FIG. 25 is an exploded view of the parts of one end of the hub assembly.

FIG. 26 is a fragmentary side elevational view of a spoke member and the clamping hub of the derrick wheel.

FIG. 27 is a fragmentary plan elevational view partly in cross section showing both ends of a spoke member and a seat pin.

FIG. 28 is a fragmentary side elevational view of an upright of the tower with the hub unfolded and in locked position.

FIG. 29 is a cross sectional view taken along lines 29—29 of FIG. 28.

FIG. 30 is a cross sectional view taken along lines 30—30 of FIG. 28.

FIG. 31 is a fragmentary perspective view of a rear knee brace about to enter the longitudinal guide member during erection of the derrick.

FIG. 32 is a fragmentary perspective view of a rear knee brace in locked position within its longitudinal guide member.

FIG. 33 is a fragmentary perspective view of the sheathed flourescent lights and the details of their electrical connection.

FIG. 34 is a fragmentary perspective view of a rear corner of the trailer showing the leveling leg and the locking collar therefor.

FIG. 35 is a fragmentary perspective view of the leveling leg shown in FIG. 34 with the housing removed to expose the locking collar.

FIG. 36 is a fragmentary perspective view of the derrick wheel in folded condition.

FIG. 37 is a fragmentary perspective view of the derrick wheel in unfolded condition.

FIG. 38 is a fragmentary perspective view of the diagonal wind brace in its retracted and locked position for transport.

FIG. 39 is a fragmentary perspective view of the venier lock and counter-weight between the telescoping members of a diagonal wind brace.

FIG. 40 is a fragmentary perspective view of a rear wind brace in the folded position on the side of the trailer for transport.

FIG. 41 is a fragmentary perspective view of one of the wind braces showing the details of the two-way pivot at the trailer frame.

FIG. 42 is an exploded view of the ends of the wind braces and the diagonal wind brace before assembly to a supporting shoe.

FIG. 43 is an assembled view of the outrigger shoe and wind braces.

FIG. 44 is a fragmentary perspective exploded view of the juncture of the singletree at one end of the master spoke with a locking hook about to be inserted.

FIG. 45 is an exploded perspective view of the singletree and locking hooks used in place of a passenger seat during erection and disassembly of the wheel.

FIG. 46 is a perspective view of a spoke rack, one being used on each side of the trailer.

FIG. 47 is a perspective view of a spoke rack in folded condition.

FIG. 48 is a fragmentary side elevational view of the movable passenger ramp showing its passenger-receiving position in solid lines and the retracted position in broken lines.

FIG. 49 is a fragmentary perspective view of the passenger ramp shown in FIG. 48.

FIG. 50 is a diagramatic view of that portion of the hydraulic system controlling the loading platform.

FIG. 51 is a fragmentary view showing the control linkage.

THE PREFERRED EMBODIMENTS

Referring to FIG. 1 there is shown the trailer unit 10 with the trailer frame 12 having the forward fifth wheel engaging means or hitch 14 and the prime mover or source of power 16 represented by a standard gasoline or diesel engine. The engine is connected to a vane-type pump (not shown) capable of delivering about 1500 lb. per square inch pressure at a discharge rate of about 26 gallons per minute as source of power for erecting, driving and folding up the wheel. The engine is mounted on rubber shock absorbers to minimize the transmission of engine vibration and noise to the trailer frame and to protect the engine from road shock. The rear of the trailer carries the trailer wheels 18 mounted on suitable springs as is well known in the art.

To the front of the trailer frame 12 are the stancheons 20 and 20' while the rear of the trailer has the shorter stancheons 22 and 22', all being located at the corners of the frame. Each rear stancheon has a column 24 of fluorescent lights which provide an attractive appearance and also light the folding steps 26 and the approach aisle 28 for the passengers.

The ferris wheel 30, here shown in the unfolded condition is rotatably supported on the axle 32 through the hubs 34 by means of the towers 36 and 36', having ladders 38, which extend from the base members 40 to the bearing housings 41 for the wheel. The towers 36 are pivotally mounted to the base members 40, as will be described, and each has a telescoping hydraulic cylinder 42 for simultaneously lifting the towers from the resting position, shown in FIG. 2, to the upright positions of FIGS. 1 and 5. Once in the upright position the towers are locked in place by the front and rear knee braces 44 and 46. The details of the base members 40 for the towers are shown in FIG. 14.

Throughout the specification, where convenient, parts which are on each side of the rig and wheel, and are essentially identical, will bear the same numbers, those parts on the drivers side or left hand side will be referred to first in the description with the parts on the back or right hand side bearing prime numbers. Where a particular structure of a part or parts is shown in more detail in the drawings it will be properly oriented to show that detail, it being understood that, where that part is one of several like components of the wheel 30 the orientation will change from that in the assembled unit and also change in the folded as against the unfolded condition of the wheel. Lateral stability for the trailer and wheel is provided by the side or horizontal wind braces 50 (front) and 52 (rear) which are shown to extend in outrigger fashion on the left side of the trailer in FIG. 1 where they are pinned to the wind brace shoe 54 and also pinned to the telescoping diagnoal wind brace 60. The same outrigger units are used on the other or right side of the trailer. The right and left side orientations are expressed in terms of the left or driver's side of the tractor unit (not shown) with which the trailer is drawn.

The wheel 30 is comprised of the spoke pairs 62 and 62', the outer spoke cross braces 64, the inner spoke cross braces 65 supported together by a system of collapsible star cross members 66 and hinged rim members 68 with cable braces as will be described. At the juncture of each rim member with a spoke member on the left side of the machine there is provided a pivotally mounted driving rim 70 (FIG. 2) to engage the drive cable 71. This cable is used to turn the assembled wheel. The assembled or unfolded wheel and trailer shown in FIG. 1 are supported on the ground surface 72 by means of the pair of forward hydraulic jacks or legs 74 and the pair of rear hydraulic jacks or legs 76, each located at a corner of the trailer and placed upon suitable planking where the ground is soft or compressible or can become so due to rain and sustained loading. The parts are best described in relation to their use during the sequence of erection of the wheel at a chosen location.

The combined weight of the trailer, wheel and all necessary equipment is about 28,000 pounds, and as a consequence, the specific position for erection of the wheel must be fairly level and have a subsoil with some degree of weight-bearing characteristics. The location should also be clear of all obstacles to a height of about 46' and no overhead obstructions should be within reach of the passengers.

After the trailer is spotted on the desired location the fifth wheel on the tractor is disconnected from the king pin 14 of the trailer. The prime mover is started and the hydraulic system turned to the "set up" position. The main hydraulic controls are located in protective panels inside and on the trailer bed 80 at the front end of the trailer. Hydraulic pressure gauges are provided and, following normal procedure for heavy equipment, these are checked to make sure that sufficient pressure is in the system and no leaks exist. Also means are provided to mechanically lock all parts that are moved or positioned by the hydraulic system so that the system is not under constant strain and no chances are taken that it may fail. The first such mechanical locks provided herein are the clamping rings 82 (front) and 84 (rear). These must be loosened, as the next step in the procedure, by means of the bolts 86.

Referring to FIGS. 34 and 35, the structure of one of the clamping rings used at each corner of the trailer is described. In this instance the left rear stancheon 22 is shown joined to the rear bumper member 88, of welded box construction, and supporting the fender member 89 for the trailer wheel. The stancheon is hollow and rectangular in cross-section and has the rectangular opening 90 in the outer wall 91. The hydraulic leg 76 has the swivel-mounted pad 92 on the lower end to conform to uneven terrain. The leg 76 operates from a hydraulic cylinder, not shown, located in the upper part of the stancheon through hydraulic lines, also not shown.

In FIG. 35, these inner parts are shown. The split ring 94 encompasses the leg on the inside of the stancheon and has the ears 96 extending through the opening 90. The corner braces 98, which are also within the stancheon, provide the proper rigidity to withstand the force of the tightening of the bolt 86. The ring 97 is affixed to the stancheon and presents a circumferential bearing surface for the ring 94. The bolt 86, when tightened, and the ring 97 prevent the ring 94 from sliding on the leg 76. The leg 76 is thus locked in position in the stancheon. Any type of swivel foot 92 can be used. The bolts 86 are loosened during operation of the hydraulic jacks as before stated.

A pair of 4-way valves (not shown) each with two actuating handles is provided within the hydraulic system to control the leveling legs 76. The handles of each extend horizontally and are moved in the direction that the trailer is to be moved. In other words, a handle is lifted to move a leg down. Lifting both handles of one valve drives the rear legs to the ground, for example. The front legs are extended until the fifth wheel is just touching the bottom of the trailer. The trailer is kept level with the fifth wheel so it will disengage easily. The air brakes and the running lights are disconnected and the tractor is driven out from under the trailer.

The hydraulic system is then operated so that the front end of the trailer is lowered approximately to a level position. There are leveling bubbles near the control handles, one showing the level left to right and the other showing the level front to rear of the trailer. In leveling the trailer is not raised on the leveling jacks any more than is necessary and the rear legs are extended just enough to take some of the load off of the tires 18, unless the slope of the ground requires greater lift. The bubble levels are centered in both directions on the rear of the trailer and then the leveling is finished by adjustment of the front leveling jacks.

In the set-up condition, with the trailer leveled as low to the ground 72 as possible, the bolts 86 of the split rings 94 are tightened on all four corners of the trailer. This relieves the hydraulic system so that any diminution of pressure will not allow the trailer to sink at any corner. The swiveling pads 92 also accommodate any planking that may be necessary.

The trailer is provided with a winch 99 operated by double-acting reversible hydraulic motors. The winch 99 is located behind and under the engine 16, central of the longitudinal axis of the trailer and between the front stancheons 20. The winch cable 100 (FIG. 2) is completely unrolled to the spool end and layed out upon the forward end of the trailer. The other end of the winch cable 100 is kept lightly tightened over the top of the derrick 102 and through a short cable loop 103 or other fastening means (FIG. 36) at the center of the axle when the ferris wheel is in traveling condition. This keeps the front of the folded derrick 102 from rising. A second loop cable at the rear of the derrick is fastened to a short fixed cable (not shown) or other fastening means attached to the trailer bed to keep the rear end of the derrick from rising during travel. These two tie downs are necessary to maintain a minimum overall height of the unit on the highway. Other tie down cables are removed in the initial steps of readying the unit for erection. When the derrick and towers are raised the winch cable is carried up without actuating the winch 99.

In FIGS. 2 and 36 the derrick wheel member 102 is shown in its folded condition, as it would appear at the beginning of the erection steps (the instant stage) or at the end of the folding steps (disassembly).

Referring to FIGS. 36 and 37 the derrick wheel member 102 is shown to comprise a series of individual hub members 104 and 104' spaced on the ends of the main axle 32 from which extend inwardly converging or box-shaped spoke members 106 affixed at their outer converged ends by means of the cable shoes 108. Each cable guide shoe has a pair of diverging flange members 110 and a rounded cable engaging surface 112. These shoes are affixed to the ends of the spoke members 106 by welding. The hub members 104 have matching or paired adjusting flanges 116 held face to face by means of bolts 118 whereby the hub members can be tightened into frictional engagement with the shaft 32.

The hub members 104 are shown in FIGS. 26 and 37 to comprise matching L-shaped brackets 120 defining a rectangular space 122 therebetween which encompasses the main shaft 32 and under pressure of the bolts 118 on each side provides opposed frictional surfaces or areas of contact 124 against the shaft. The lineal dimensions of the area 122 with the shaft removed and the bolts 118 tightened is less than the area of the shaft by an amount sufficient to allow the bolts to be tightened, with the shaft in place, and bring the brackets into frictional contact with the shaft.

Three separate spoke members 106 are used and the outer ends are connected by means of the six fixed length cables 126 (FIG. 37) attached to pins 114, the last cable member 126' of which has a releasable hook 128. The derrick spokes 106 are rotated by hand into the circular form shown in FIG. 37 to the limits of the cables 126 and finally the last cable 126' is fastened by means of the hook 128 to complete a derrick wheel 102. In this position the cable guide shoes 108 are all circumferentially arranged in a common plane around the axle 32. The hubs 104 engage the shaft 32 with only such frictional force as will allow the fanning of the derrick into the condition shown in FIG. 37 by hand.

After the derrick wheel is fanned out to the condition shown in FIG. 3 or FIG. 37 the clamp bolts 118 are tightened firmly enough so that the L-shaped brackets 120 will not slip and will turn when the ferris wheel 30 is in operation. These clamps are maintained tight enough to avoid slippage of the derrick wheel 102 on the main axle. The derrick wheel 102 need not be positioned at any particular point circumferentially of the main axle and will work properly in any position. The derrick wheel stays in its open position at all times when the ferris wheel is erected and operating. Each pair of similarly positioned hubs 104 carries a pair of V-shaped spokes 106 in a common plane on each side of the axle 32. Thus the spokes on the inside are a rectilinear or box-shaped unit held by the inner hubs and have their cable guides on the top left and bottom right in FIG. 36. The outer hubs 104 carry the outer spokes with their cable guides on the bottom left and top right in FIG. 36. The intermediate hubs carry the intermidate spokes as a unit with thier cable guides between the others as shown in FIG. 36. It is apparent that the outer spokes are somewhat longer than the inner ones. As the derrick 102 is unfolded the derrick cable 100 is aligned within the cable guides 108.

The next step in the assembly is to unhook the front and rear wind brace cross bars 50 and 52. These bars are each affixed at one end to the sides of the trailer frame 12, fore and aft of the towers 36, by means of the universal joint 130 shown in FIG. 41. The joint 130 comprises a pair of spaced brackets 132 and 134 having aligned bores carrying the pin 138 rotatively thereon. The sleeve 136 rotatably engages the pin 138 and is thus permanently attached to the trailer frame 12. The sleeve carries the vertical flange 140, welded thereto, and having a crossbore carrying the bolt 142 which engages the spaced flanges 144 at the end of each of the cross bars 50 or 52. The universal joints 130 are spaced fore and aft of the center of the trailer frame 12 and also fore and aft of the towers 36 as shown in FIG. 1. By these means the bars 50 and 52 can be swung outwardly so that their ends come adjacent to one another as shown in FIG. 42.

Since the bar 52 on the left rear and the corresponding bar on the right rear are close to the wheel 18, they are hinged intermediate their ends as shown in FIG. 40 so they can be folded and swung into the position shown for engagement with the bracket 146 and thus be secure on the road. The hinge comprises the paired spaced flanges 148 and 150 tied by means of the permanent pin 152 which divide the bar 52 into the two segments 52' and 52". By swinging the segment 52" on the pin 152 the holes 154 in bracket 148 register with the holes 156 in bracket 150 to receive a cross pin or bolt 158, such as is shown in FIG. 42. The bross-bolt 158 is illustrative of one of several pins used in different sizes and lengths to quickly and surely tie parts together. This bolt has the head 160, larger than the shank 162, and a champhered end 164 with a transverse bore 166. A smaller pin or key 168 with a hook 170 encompassing the ring 172 is provided to fit into the bore 166. Once the key 168 is in place in the bore 166, the ring 172 drops over the end of the shank as shown in FIG. 43 and prevents the pin from coming out in any rotational position of the bolt. If desired the pin 152 (FIG. 40) may be the same as the pin 158. In another embodiment, bar 52 can be one piece as the bar 50 and not folded.

The front bar 50 (FIG. 42) has the ear 174 at the outer end and a similar ear 176 is provided at the end of the bar 52. With the bars in their extended position the ears are opposed and can be brought against each other so that their bores 178 register. In this position the wind brace foot 54 (FIG. 42) is brought itno position so that the ears 174 and 176 fit between the spaced vertical flanges 182 having cross cores 184.

The wind brace foot 54 has a flat bottom 186 having holes 188 in each corner, slanted end walls 190, vertical side walls 192 to form a flat reinforced plate. The bottom 186 has the seat 194 which engages the end of the adjusting bolt 196 carried in a threaded bore within the block 198 supported by the flanges 182. The base inner ends 199 of the flanges are hinged to the spaced inner walls 200 by means of the pin 202. The swivel 204 engages the bolt 196 below the block 198.

In FIGS. 42 and 43 the lower end of a diagonal wind brace 60 is shown having the spaced ears 206 with matching cross bore 208 which pass on the outside of the flanges 182 in which position the cross bolt or pin 158 is inserted through the bores 208, 184 and 178 to tie the bars 50 or 52 and the wind brace 60 to the wind brace foot 54. The ring 172 springs into locked position. The bolt 196 is turned up or down against the seat 194 to adjust the foot 54 so as to be flat against the support surface 72. The diagonal braces 60 have the handle members 210 engaged in a suitable bore hole near the end and held by means of a cotter key 212.

The top ends of the diagonal wind braces 60 are also hinged to the towers 36 just under the bearing housings 41 in any suitable manner such as through hinge member 214, generally shown in FIGS. 4, 5, 6 and 7 which can be of the type shown in FIG. 38 as illustrated by the bottom hinge or latch 216 for the same diagonal braces. In this instance the U-shaped cleat 218 carries a crosspin or bolt 220 through suitable bores in the ears 206 (see FIG. 42) on the lower end of the braces 60. The base 222 of the cleats 218 is affixed to the trailer frame 12 opposite the base member 40 on each side of the trailer. The cross pin 220 has the C-spring or so-called hair pin 224 to hold same in place and for ease of removal.

Each wind brace 60 (FIGS. 38 and 39) has an outer tubular member 226 and in inner tubular member 228 fitted in telescoping arrangement. The member 228 has a series of equal spaced bore holes 230 extending through opposite side walls and registering transversely one with the other. The holes 230 are located at about a mid-point of the member 228 or near the upper end of this member. The tubular member 226 has the series of bore holes 232 extending through opposite side walls in corresponding relationship as shown in FIG. 39. This series of bore holes 232 are spaced closer together, e.g. at one and one-half inches center-to-center so that when the wind braces 60 are extended, that is when the member 228 is telescoped outwardly of the members 226, to the position shown in FIG. 43, a pair of bores 232 registers with a pair of bores 230 to receive pin 220 with the C-spring 224 to hold same in place. The combination of holes 230 and 232 transverse of the wind brace can register at one position therealong and give finite adjustment of these parts. A reinforcing plate on the outer surface of the member 226 can be used.

The wind braces 60 are left affixed to the towers 36 until they are erected which is the next operation to be described. However the wind brace cross bars 50 and 52 and feet 54 are positioned first, and assembled before the towers are erected.

As shown in FIGS. 2 and 3, the ferris wheel 30, in folded assembly, forms a rectangular compact stack in travel condition on the forward end of the trailer 10 with the towers 36 pivoted down on the front stancheons 20. A number of sway brace cables are used to stabilize the assembled unit in relation to the ground 72. Other cables are used to tie the top spokes of the stack to the trailer, in the travel position. Also spoke clamping angles (not shown) are bolted through the stack of spokes to give lateral stability in the travel position. To ready the unit for erection these tie down cables are removed, but the spoke clamping angles are not removed until the towers are erected. The drive cable 71 is secured along the left side of the trailer in travel position. This cable is now pulled out so it is outside the wind foot and cross bars and over the stancheon 22 at the rear of the left side. This is so that this cable will be out of the way of the corner guy cables and the wind brace when it is installed. A pair of rear knee braces 233 is provided (FIGS. 2 and 3) which are hinged to the inside of the towers 36 at their upper ends. Any pins or fastenings used to hold down the rear knee braces are removed.

With the winch cable 100 unreeled all the way from the winch 99 and over each cable shoe 108 of the derrick wheel 106, the control lever (not shown) for the hydraulic valve operating the hydraulic cylinders 42 is opened gradually, with the prime mover 16 running, so that the cylinders 12 gradually extend as in FIG. 4 until the towers are in the vertical position shown in FIG. 5. Pushing down on the control lever lowers the towers.

During the sequence of FIGS. 3, 4 and 5 the control valves are first opened a little to raise the towers off their seats 234 on top of the forward stancheons 20. as shown in FIG. 1, these stancheons have a V-notch seat 236 in the top and the seats 234 have a corresponding V-shaped shoe on the bottom surface to fit or mate therein and give stability to the stack. With pressure on the cylinders 42, an air bleed valve 238 (see FIGS. 4 and 13) in each cylinder is opened to bleed off any air in the system. Then the valves are closed.

The spokes 62 of the wheel 30 are closely spaced inside the stancheons or tower rests and should be watched so they do not snag as the towers are raised. Care is exercised to move the cylinders 42 together. If one cylinder is ahead, that valve is closed completely and pressure applied to the other cylinder until it is even and then the valve is opened again.

The front knee braces 240 are hinged at their bottoms to the trailer bed as at 242 (FIGS. 2, 13 and 14) at the intermediate hinge 244 and at the top 246 where they are affixed to the front side of the towers. The intermediate hinge 244 has a flanged plate 248 with holes 250 therein. As the towers rise the front knee braces 240 unfold as shown in FIGS. 4 and 5 and a pin 252 is inserted to lock the knee braces in place.

Referring to FIG. 5 there is shown a pair of front guy cables 254. Each is fastened to the top outer end of the towers 36 and to a linkage 256 having a shock absorber 258 between the linkage and the trailer bed. As the towers reach the vertical position (FIGS. 5 and 7) the guy cables 254 are taut and the shock is taken up by the shock absorber 258 as the assembly goes over center.

The base of the trailer at the rear is provided with the pair of guide plates 260 (see FIG. 32) having the spaced parallel side rails 262, the angled tabs 264 at one end and the ears 266 with the matching bore holes 268 at the other end. Each of the rear knee braces 233 has a shoe 270 adapted to fit within the guide rails 262 as the derrick is raised. The shoes 270 have the sleeves 272, welded transversely across the top. As the towers come to the vertical position, and the front knee braces straighten, the shoe 270 will have passed between the tabs 264, along the guide 260 and to the point where the sleeves 272 register with the holes 268 to receive the locking pins 274.

Referring to FIGS. 13, 14, 28, 29 and 30, the tower base members 40 on each side of the trailer are shown to comprise the outer plates 276 and the inner plates 278 affixed to the trailer bed 280. At the base of the towers 36 a pair of lobed support plates 282 and 284 are affixed and the permanent hinge pin 286 extends through the front lobes of the plates 282 and 284 and the front parts of the plates 276 and 278. This assembly (see FIG. 28) is anchored to the beam 288 by means of the supports 290 and permanent pins 292. The plates 282 and 284 have a second pair of matching holes 294 (FIG. 4) which register with matching holes 295 in the plates 276 and 278 to receive the locking pins 296 when all parts register and the towers are vertical. The pins 296 have a square hole or slot in the end which in their extended position through the plates is open to receive the tapered keys 300 (FIG. 28). A pair of down stops 301 carried by the tower adjustably engage the base for alignment of the pin 296.

In the stacked position the spokes of the wheel 30 rest upon the folding spoke rests 300 (FIGS. 46 and 47) located on each side of the trailer just forward of the tower bases 40 and supported upon the trailer bed by the cleat 302, bearing the removable cross pin 304 which engages the bifurcated upright 306. The top of the upright 306 has the shoe 308 with the spaced side walls 310 and the bottom 312 with the flared tabs 314 acting as guides to receive the folded rims 68 to be described. Between and below the tabs 314, across the opening therebetween and slightly above the bottom 312 is located the roller 316 operating on the axle 318 affixed between the braces 320 of the shoe. This unit is supported by the angle brace 322 affixed at the top end to the braces 320 by the pin 324 and hinged to the floor 280 by the pin hinge 236. The purpose of the roller 316 is to support the folded wheel in a manner so that it can slide slightly fore or aft to allow for and prevent and binding of hinge pins within the wheel and not lock up the stack. Another purpose of the rollers 316 is to allow for the slight rear motion of the folded assembly as the towers 36 are raised by the hydraulic lifts 42 and forward motion as the assembly folds down to the position of FIG. 2.

The last operation in raising the towers 36 is to fasten the rear guy cables 328 (FIG. 7) to the rear stancheons 22, on each side of the trailer.

With all of the locking pins in place the wheel is now in the condition shown in FIG. 5, with the cables 254 snapped taut and the front and rear knee braces in place. The wind braces 60 are now detached from their bottom hinged cleats 216 (FIG. 38), by removal of the pins 220, lifted by the handles 210 and swung outwardly and telescoped downwardly to the position shown in FIG. 43 for attachment to the wind brace feet 54. The pin 220 and the pin 158 can be the same for this purpose.

The wind braces 60 are hollow to provide room for a counter weight suspended by a cable therein so that the weight of the inner tubular member 228 is counter-balanced and can be easily handled and spotted in the feet 54. Such an arrangement is shown in FIG. 39 where the tube 228 has the pin 328 affixed at the top end and fastened to the cable 330 which passes over the sheave 332 on the shaft 334, affixed at the top of the outer tube 226 above the top end of the tube 228. The shaft 334 can be the top hinge pin at the tower for the wind braces 60, to give the maximum telescoping ability. The cable 330 carries the counter-weight 336 at the other end which is heavy enough to balance the weight of the tube 228. The counter-weight is free to reciprocate within the tube 228 as the tubes are telescoped one upon the other. Thus the wind braces 60 can easily be handled by one man. The telescoping can be through a 27 inch range at the vernier holes 230 and 232 to accommodate variations in the ground slope. In the retracted position the handle 210 is adjacent the bottom 338 of the tube 226 as shown in FIG. 38. Once in position on the shoe 54 the pins 220 (or 158) are driven to the position shown in FIG. 43, and the bolt 196 turned to plumb the towers 36. This is done on each side of the trailer. This completes the stabilization and levelling of the towers and trailer.

Rereferring to FIG. 1, the ferris wheel 30 is shown to comprise the radial spokes 62, the cross braces 64 which are spaced from the axle 32, the collapsible star members 66, which carry the decorative lights, to be described, and the rim members 68 which are hinged at their juncture with each spoke and also at a mid point. The wheel 30, in its folded condition and ready for fanning, is illustrated in FIG. 5 wherein the slack in the winch cable 100 has been taken up and now passes from the winch 99 over the unfolded derrick wheel 102 and is attached at the other end to the top most, main or No. 1 spoke by means of the single tree 342 shown in FIG. 45. The single tree 342 comprises the main beam 344 with the reinforcing plate 346 welded to the under side and including the center bore 348. The winch cable 100 is attached to the bore 348 by any suitable means such as a U-hook and lock pin known in the art. The single tree 342 is adapted to attach and lock onto the seat pins 350 (FIG. 27) of the top most or No. 1 spoke. A pair of such seat pins 350 is provided on the inside outer ends of each spoke 62 for the purpose of supporting a passenger seat therebetween. To accomplish this attachment the single tree is provided with the end plate 352 welded to the extended end 354, at each end, and the diverging plates 356 thereunder which are closed at the top and spaced from each other at the bottom edge 358. On the inside surface of each plate 356 the lugs 360 are provided and positioned opposite each other and from the plate 352.

In order to safely hold the single tree 342 upon the seat pins 350, the lock members 362 are provided (see FIGS. 44 and 45). The lock members comprise the locking plate 364 and the inner plate 366, the latter having the bottom hook 368, directed inwardly during use and an off-set tab 370 at the other end with a recessed edge 372. At the curved shoulder 374 of the tab 370 there is provided an aperture 376. The hooks 368 serve as handles in using the locks.

Both plates 364 and 366 are generally triangular in shape so that their respective edges 378 and 380 conform generally to the angle subtended by the plates 356 of the single tree and the lock member 362 will fit therein. The plate 364 has a bore while the plate 366 has an opposing bore to receive the bolt 386 which carries the compression spring 388 therebetween. The bolt has suitable heads 390 at each end larger than the respective bore holes to hold the assembly together. The plate 364 has the tab 392 which hingeably engages the aperture 376. Thus the lock members are adapted to be inserted edgewise between the plates 352. In this position the edges 380 of the plate 366 abutt against the plates 356 in matching relationship and the recess 372 is spaced from the plate 354 to accommodate this seat pin. Also the plate 364 is engaged by the lugs 360 and compressed against the springs 388. The seat pins 350 have a circumferential groove 394 (see FIGS. 16 and 27) spaced from the end. At the same time the recess 372 engages and locks in the groove 394 of the seat pin, the lower edge 396 of the lock member 362 snaps over the top of bar 398. This holds both ends of the single tree to the respective seat pins and allows its rotation therein. Instead of the lock members 362 the plates 356 can have the bore 375 to receive a pin to engage the groove 394 and hold the single tree to the seat pins.

Each seat pin 300 is affixed to the end of a spoke 62 and held by means of a lock nut 400. On each side of the seat pin each of the spokes 62 carries a pin 402 to which the individual rim segments 404 are hingeably attached. Once the single tree is in position upon the opposing seat pins of the top most spoke 62 (No. 1 in the stack) and the seat locks or pins for bores 375 are engaged, the winch cable 100 is attached to the hole 348 as before described.

The folded wheel (FIG. 7) has four seats 405 carried permanently at the positions Nos. 3, 6, 9 and 12. The weight of the spokes, rims and these four seats is carried on the spoke rests 308 during transit. With the towers 36 raised, the spokes still lie against the rollers 316 on the rear side or end of the spoke rests. The spoke clamping angles are removed and any tie-down chains released. In order that the wheel 30 can unfold or fan out as the winch 99 is operated the stack must be moved rearward and the bottom most spoke 62' (FIG. 5) must be held stationary. For this purpose a spoke tie cable 406 is affixed at one end to any convenient place upon the trailer such as over the end of the rear knee brace. The spoke tie cables 406 have a hook for attachment of the seat pins of the last and lowermost spoke 62'. A quick action turn buckle is used in these linkages 406 in order that the entire stack of spokes can be pulled slightly to the rear and thus clear the rollers 316 within the spoke rests 300. Later in the fanning process, spoke 62' (No. 12) rises above the rollers and would swing forward toward the front of the trailer, out of control, if not restrained by the spoke tie cable 406.

The winch is now operated through the hydraulic drive supplied by the prime mover 16 and the cable 100 is gradually wound thereon until the wheel is fanned to the position shown in FIG. 7. It will be observed that as the first or main spoke 62 begins to move upwardly there may be a tendency for the second spoke to move up also. This second spoke can be held back by hand. As each rim section is pulled out it is straightened from the position shown at 68' in FIG. 7 up to the position 68". The next condition of these parts may be illustrated by reference to FIG. 15 wherein the rim rection 68" has been straightened Each rim section has a pair of tabs 408 bearing the hinge pin 410 therethrough. These hinge pins are placed off center of the rims 68, i.e. the rim sections are not of equal lengths to provide for slightly canted folding. One rim section has a pair of extending tabs 412 which have the bore hole 416 therethrough to receive a pin like 158 (FIG. 42) therethrough to lock the sections in a straight line, i.e. prevent them from hinging inwardly. If the wheel is fanned out entirely without pinning the rims at their center points the entire weight of the unfolded sections is on the winch cable, a condition to be avoided in these kinds of mechanical operations.

As the wheel is opened the light panels 66 open automatically to form two 6-pointed stars. FIG. 17 shows the juncture of the light panels 66 with an inner cross brace 64. All but the last of the star points have the inner configuration shown in FIG. 17, the outer configuration shown in FIG. 18, wherein each star has a pair of support members 408 carrying the decorative lights such as fluorescent lights 410 on one side and having their ends hinged as at 412 to the plate 414 affixed to the under side of a cross brace 64. Referring to FIGS. 18 and 19, the relationship of these parts at their outer ends is further shown wherein the outer cross brace 64, carried between each spoke pair, has affixed thereto the paired links 416, on each side, with rollers 418 at the ends engaging in the channels 420 located on the sides of the supports. The channels 420 are long enough so that the rollers 418 do not run off the inner ends in folded condition and cannot be pulled from engagement with the rollers in the extended position. At both the inner and outer points of the panels a jumper cable 426 and 428, respectively, is provided to interconnect the lights in the circuit.

Referring back to FIG. 15 it is seen that at each juncture on the left side of the wheel of a spoke 62 with a pair of rims 68 there is located a drive rim 430 having the spaced side walls 432 formed in two lobes on each side of the track 412 which has a rubber bottom surface for frictional engagement with the drive cable 71. The drive rim 430 in FIG. 15 is in the folded condition wherein it is turned in reverse or folded position along one of the rim sections from its permanent hinge 434 and affixed by means of the removable pin 436.

As each rim section 68 is locked into the position shown in FIG. 15 the pins 436 are removed and the rims swung to the position shown for drive rim 430' with the pin 436 locked to the bore hole 438 on the adjacent rim section. The drive rims 430 are thus locked across the juncture of the rim sections with the spokes on the left side of the wheel either progressively during the unfolding of the wheel or preferably after the wheel is unfolded, all with their driving surfaces 412 facing outwardly. (In the folding operation the two cleats 440 having inwardly inclined surfaces 442 serve to properly align the rim sections in relation to the spokes at each hinge joint 402 so that the edges 444 do not catch, etc. The rollers 446 engage the cleats 440 in the folding operations so that the parts hinge one upon the other with little or no friction.)

As each of the seats Nos. 3, 6, 9 and 12 come past they are unhooked from the positions shown in FIGS. 2 and 3 and allowed to swing freely on their seat pins in the normal hanging positions. The seats are readily unhooked from the rear. In the position of the wheel in FIG. 7 the load on the winch cable is the greatest and as soon as it breaks over the top, the load on the cable becomes smaller. When the wheel is unfolded to the point where the master spoke 62 is pointed at the winch 99, it can be pulled no further by the winch and at this time the wheel is nearly balanced. The winch is let off, and the weight of the single tree 342 is sufficient to pull the wheel the rest of the way around. With the single tree near the towers, the final rim halves are brought together and pinned. The final rim halves are the same as the rim halves 68' in FIG. 15 except the pin 410 is made removable at the center.

The spoke rests 300 are now folded down to the position shown in FIG. 41. A spoke hook, not shown, is employed to control the wheel at this time and position it sequentially and firmly in various positions to complete the fastening of the hub members and also install the seats and drive cable. This spoke hook may be in any desired form, having a downwardly opening hook at each end and long enough to reach from the cleat 302 and pin 304 (of the spoke rest, now folded) and a bottom seat pin. The hook at the seat pin end is heavy enough to keep it securely fastened to this pin.

The single tree and winch cable are disconnected and the latter wound up on the winch to be out of the way. On the end of each spoke there are four rim pins and a seat pin. Two of the rim pins 402 are permanent but form relatively loose pivot points. Using the seat hook to hold the wheel in sequential positions, it is gradually turned and the lock pins 450 (FIG. 27) are driven in and locked with hair pins. This stabilizes and tightens the wheel.

The drive rims on the left side keep the lock pins 450 in place. All of the driving rims are now repositioned, as before described, so that their flanges open outwardly as shown in FIG. 44 and fixed with hair pin cotters. Spacing washers can be used to align the driving rims circumferentially.

As the wheel was opened all of the top or inner ends 452 of the spokes moved automatically into the hubs 34 (see FIGS. 23 and 24) carried by the main axle 32. The spokes 62, which may comprise two parallel members 454 and 456 are held by means of the plate 458 and suitable fasteners as shown. The adjacent plates of successive spokes are hinged to each other by the side plates 460 and the fasteners 462 and hinge pin 464. FIG. 28 shows the outside of the assembled hub with the side plates 460 and ends 452 in place radially of the hub.

Each plate 458 has an ear 466 with a bore hole 468 therethrough. The hub 34 comprises the plates 470 and 472 bolted to each other and spaced by the spacing lugs 474 defining therebetween the spaces 476 adapted to receive the tenons 466. Once in place the shoulders 478 of the plates 458 engage the top surfaces of the lugs 474 and mate with the circumferential outer periphery of the hub, abutting each other side to side in locked position. As the wheel is unfolded the spokes move sequentially from the condition shown in FIG. 24 to that of FIG. 23. The hub 34 is affixed to the shaft 32 by any suitable means and the outer ends of the shaft are supported at the top ends of the towers 36 by means of suitable lubricated journals not shown. The No. 1 or top most spoke 62 of the stack is permanently affixed to the hub 34 by the fixed pin 480. This leaves twenty-two hub pins 481 (eleven on each side) for installation through the holes 482 through each of the bores 468 of the ears 466, once they are in place.

The plate 470 has three equally spaced permanently affixed spring-loaded lugs or hub bolts 484 extending from the inside surface. The lugs 484 each have an outer retainer washer 485 just under the head and spring 487, holding against the washer, and are affixed to the plate 470 so that the head of each lug is spaced from the plate and the washer is pressed to the head by the spring. The retaining ring 486 is provided as a locking means and has the three equally spaced apertures 488 with interconnecting slots or counterbores 490 therethrough. The slots 490 extend circumferentially in a counterclockwise direction around the ring and have a counterbore to receive and lock the hub bolts. The apertures 488 are spaced and sized to pass over the lugs or hub bolts 484 while the slots are designed to engage the shaft part and are smaller than the lugs. The ring 486 is located around the shaft 32 as shown in FIGS. 23 and 24 and after the hub pins 481 are all inserted, engaging each of the plates 458 of the unfolded wheel, the ring 486 is pressed against the washers 485 with the heads of the bolts 484 within the apertures 488 and turned clockwise to lock the slots 490 between the heads and the washers. At this time the four jumper wires are connected to the two stars and the light panels, that cross between the master spoke and the last spoke, can be connected.

The arrangement of these last light panels is shown in FIGS. 20 and 21 wherein the panel 66' is shown to comprise the altered support 408 having a pair of side channels 420, as previously described in relation to FIGS. 18 and 19, carrying the light 410 and having the top U-shaped handle 411 with the cleat 413 across the end having the apertures 415 at each end to receive the pin 158 with the locking hair pin 493, such as is used in other fastenings described. In the travel position (FIG. 20) the panel is affixed to the cross bar 64 of the spoke No. 12 by means of the pin and cleat as shown, and in the assembled condition (FIG. 21) it is swung to a cleat on the cross bar 64 of the main or No. 1 spoke.

The wheel is now ready for truing. A gage block or other piece of wood seven and seven-eighths inches long is used to measure the distance between each spoke, on top of a drive rim, and the flat inner side of the tower. The adjusting screws 196 on the outriggers are used to true the wheel, i.e. to shift the wheel to the right, the adjusting screw 196 in the right wind brace is backed out. The various spoke cables 491 and their turn buckles can be used to make finite adjustments.

The drive cable 71 (FIG. 22) is next to be installed on the drive pulley 492 and the idler pulley 494, each mounted on their respective shafts 496 and 497. The drive cable never needs to be removed from the idler pulley 494. A jack 498 is located forward of the idler 494 and adapted to ratchet along (fore and aft) a track, not shown, in the bed of the trailer, through the reciprocation of the handle 500. The jack is connected to a pair of rods 502, having the turn buckle 504, which are tied to the pivot support 506 (above the axle 497), and which supports the idler at the lower pivot point 508. The jack 498 is used to make macro-adjustments of the distance between the idler and drive wheels while the turn buckle 504 is for finite adjustments. The drive and idler pulleys have double grooves. The drive sheave grooves are adjacent each other, which places a slight angle on the slack side (right hand of FIG. 22) of cable 71. In order that the groove of each drive rim 430 be aligned with the oncoming slack cable each drive rim is skewed about ¾° overall on the wheel, e.g. drive rim 430' is mounted in toward the wheel further on pin 436 than its following pin.

The idler wheel is pulled back toward the drive wheel to allow placement of the cable 71. With the cable in both grooves of the idler, a wrap of the loose cable is placed over the hub of the drive wheel, then the cable is unrolled out to the left side of the trailer beyond the wind brace as far as it will go. A loop of the cable is dropped over the drive rim directly above the drive sheave and the wheel is turned slowly in the normal direction indicated by the arrow 510 of FIG. 1. The cable is fed into the drive rims as they come by. The idler is then tightened with the jack and adjustment completed with the turn buckles. The cable makes two clockwise wraps around both sheaves.

The wheel is now turned slowly with the engine 16 operating to drive the sheave 492 through the hydraulic drive means and the drive cable is checked for proper tracking in the driving rims. The cable should not ride against the side of the grooves nor rub where it crosses at 512 above the two sheaves. The drive cable is operated as loosely as possible without slippage and with no obvious slack when the wheel is stopped.

Of the remaining seats, Nos. 1, 2, 4, 5, 7, 8, 10 and 11, five are located on the floor of the trailer toward the front and three are stored in the rear end, all tied down and in canvas covers. The seats are united and hung in proper sequence through the use of the seat locks 362. The seats have handle bars which are put in place and foot bottoms which are hinged out and locked. Three of the seats are stored by lashing to a wooden framework which slides into the passageway 28 at the rear of the trailer frame (FIG. 8) and rests upon the plate 514 between the stancheons 22. The seats are easily removed from the seat frame and the seat frame is then stored on the wheel.

Referring to FIGS. 8, 9 and 10, the former shows the rear of the trailer in travel condition and the latter shows the sequence of unfolding the steps 516. This foldable unit comprises a back plate 518 carrying the trailer lights 520. The license plate 522 is carried by the plate 524 which is hinged at 526 to the plate 518. The bottom edge 528 of the hinged plate 524 fits forward of the bumper 26. The plate 514 and the plate 518 are welded at right angles to each other and to the side plates 530 with the steps 516 therebetween. The unit is hinged to the bumper 26 and frame by the pair of tabs 532 and the rounded tabs 534 of the side plates, held on each of the sides by the hinge bolts 536 carried by the metallic grounding bushing 538 as shown in FIG. 12. A pair of doors 537 hinged at 539 overlap the plate 518 in closed position. With the doors open the step is folded out, and the plate 524 swings free of the bumper, as in FIG. 9, and ultimately hangs on the back side of the step unit. In the unfolded condition the steps 516 engage the bumper 26, through the cut-out corner 540, so that the bumper becomes the top most step. The top of the bumper 26 is level with the plate 542 to provide a level walking surface and approach to the seats of the ferris wheel. The side plates 530 carry the hollow stancheons 544 on each side of the bottom step. The top edges 546 of these stancheons are in the same horizontal plane as the edges 548 of the tabs 534, so that in the folded condition (FIG. 8) the steps are firmly supported on the plate 542, with the stancheons 544 resting upon this plate. All walking surfaces are made of slip resistant material. The steps are fully supported on the hinge and bumper and do not touch the ground.

A pair of tubular uprights 549 (only one shown) are affixed to the trailer body on each side of the passageway and have a tubular hand rail 550 at the top. The stair rails 552 are identical having the offset end 554 to engage the rail 550 and the post 556 at the bottom end, which fits into the stancheons 544 as shown in FIG. 11. A cross bore is provided so that one of the lock pins 158 can be used to fasten the hand rails to the folding steps. A part of the top of the stancheon 544 is cut out at 558 so that these parts are readily assembled, and alignment or matching of several bores is unnecessary. Finally any guard ropes deemed necessary on each side of the wheel are installed for which purpose a number of cleats are provided on the sides of the trailer such as the brackets for stowing the wind brace cross bars.

The lighting system for the ferris wheel of this invention includes the two six point stars with a total of twenty-four light panels each having a 30 watt and a 40 watt rapid start fluorescent lamp. No more than four electrical jumpers are connected or disconnected in the folding and unfolding of the wheel. The lamps 24 on the stancheons 22 are permanent and are covered with a canvas during travel.

Referring to FIG. 33 representing a fragmentary view of the tower 36 with the steps 560 of the ladder illustrated, all the lights 24 are enclosed in colored flexible plastic sleeves 562. The sleeves may be any desired color. The sleeves fit over and are spaced from the lamps proper and have the open-ended collars 564 with retaining rims 566 at each end. The collars fits snugly over the end plugs or caps 568 of the lamps to engage the sleeves 562 at each end, and not interfere with the electrical connections. In each tower 36 there is a main conduit 570 carrying the electrical leads 572 to the other lights along the tower and to each of the stars of the wheel. A junction box 574 is provided so that repairs and connections can be made, etc. The individual leads 577 for the lamps along the tower are shown. Tubes 562 come off with each light and the collars 564 snap on to the lamp bases so that the tubes remain on the lamps under ordinary handling.

The tubes 562 serve to protect and insulate the lamps and in the event of accidental breakage prevent falling glass from reaching the passengers or crew. Within the box 574 the plastic dowell pin 565 is held by the screw 569 and the hose clamp 571 encompasses the wires to protect them from road vibration.

The electrical system operates on a 60 cycle, three-wire system. Each socket in the light panel is individually grounded to the frame. A main breaker box and outlet are provided to connect power cable of the trailer to a 110 volt or a split 220 volt source. A suitable ground must be provided for the entire system.

Referring to FIGS. 2 and 4, there is shown the loading platform 580 in retracted position, and in FIG. 7 this platform is shown in extended position. The latter view is for illustration purposes only since the platform is not operated until the wheel is ready to receive passengers. Referring to FIG. 48, the details of the construction of the loading platform are shown, with the extended position of the parts in full lines and the retracted position shown in broken lines.

Referring to FIGS. 48 and 49, it is seen that the trailer body 10, just forward of the stancheons 22, has a transverse wall 582 and the plate 514, upon which the passengers walk, has an up-turned ramp 584 at the inner or forward end. The loading platform 580 has the ramp tread plate 586, and the integral end plate 588, of the same width, with the pad 590 thereon. The pad 590 is shaped so that it comes directly under the foot rest 591 of a seat 405 (partly illustrated). At the rear outer corners of the tread plate 586 a pair of tabs 593 are provided. These tabs are hinged to the wall 582 by means of the brackets 594 and the pins 595. The plates 586 and 588 are affixed to each other at such an angle that when the loading platform is extended the ramp 584 and the tread 586 are in a common plane or incline, while the plate 588 registers with the foot rest 591. The plate 588 has a pair of tabs 596 extending from the under forward side which are hinged to the bifurcated linkage 600 by means of the pins 602.

The wall 582 also supports a top bracket 604 and a bottom pair of brackets 606, each located central of the loading platform and each having the respective hinge pins 608 and 610. The pin 608 hingeably supports the hydraulic cylinder 612 at its upper end and the pin 610 hingeably supports the yoke member 614 centrally under the assembly. The yoke member has the central double bracket 616 which is hinged through the pin 618 to the piston rod 620 of the hydraulic cylinder. The yoke member 614 has an outer pair of brackets 622 which are pinned or hinged to the lower ends of the bifurcated links 600 as by means of the pins 624. A plate 626 is provided just ahead of the linkage to protect it. This plate is removed in FIG. 49 to show the linkage. It is to be observed that when the loading platform is in the full line position the linkage 600 and 614 supporting the platform goes slightly "over center" on the pin 624 so that the cylinder 612 does not carry the passenger weight but only moves the linkage.

There are only two controls for operating the wheel once assembled. One is the brake ratchet handle 630 mounted to the trailer body on the pin 632 and controlled by the ratchet release arm 634 having a spring-loaded dog (not shown) at the lower end which engages the teeth 636 of the radial ratchet affixed to the trailer. Coupled with the handle 630 is the mechanical brake linkage 638 which connects to a shaft 722 (FIG. 51) controlling a mechanical brake on the drive sheave 492 located on the left side of the trailer. The foot treadle 640, located conveniently near the handle 630, where the single operator of the wheel would stand, is the second control and constitutes a means for operating and extending the cylinder 612, which is connected by suitable hydraulic lines to the hydraulic system. The handle 630 also controls the hydraulic motor 674 (FIG. 50) which turns the wheel through the drive sheave 492.

To operate the wheel the operator merely moves the handle 630 toward the front, i.e. in the direction of the arrow 640, to start the wheel turning. Moving the handle the reverse of arrow 640 slows the wheel down. In order for the loading platform to be raised, the handle must be moved firmly to the rear, i.e. to about the position shown in FIG. 48. This sets the mechanical brake through the linkage 638. The linkages are adjusted so that with the handle 630 pulled all the way back and locked, there are one or two teeth 636′ of the ratchet still to go. This gives reserve braking movement, if needed. The hydraulic system to which the foot treadle 640 is connected is arranged so that the treadle 640 can only be operated when the brake on the drive sheave 492 is set. Only then will foot pressure on the treadle 640 operate the cylinder 612.

That portion of the hydraulic system relative to the foregoing functions is shown in FIG. 50 wherein the prime mover or motor 16 is connected to drive the main pump 650 connected via the line 652 from the supply or sump 654 to the selector valve 656, shown set at the "operate" position. The second position or "set up" circuit of the valve 656 connects through the line 657 to the tower cylinders and front and rear leveling cylinders, with which the instant description is not concerned. These are operated through direction control valves in the usual manner.

The line 658 connects to the directional control valve 660, through the branch lines 662 and 664. The branch line 666 leads to the pressure control 668, set at 2000 p.s.i., and to the sump with the line 664. The line 670 leads to the check valve 672 and to the drive motor 674, connected to the line 676. The branch line 678 connects to the check valve 680, to sump and to the pilot valve 682 and to the line 684 and the pressure control 686 and the filter 688 to sump. The line 690 connects from the line 670 to the cylinder 612 controlling the loading platform and the line 692 with the line 694 completes the circuit through the valve 660. The branch line 696 connects to the balanced piston-type maximum pressure valve 698 and to the sump, while the line 700, controlled by the valve 702 connects through the pilot valve or pressure regulating valve 704 back to the line 670. The line 706 connects to the valve 686, to open and close this valve in response to the static pressure at the inlet of the motor 674. The line 708 serves to bleed any excess and possibly damaging back pressure from the outlet of motor 674. The connecting line 708, the pressure control and metering valve 710 and the accumulator 712 complete the system.

The valve 656 is a selector valve controlling the direction of flow of hydraulic oil to the "operate" circuit, line 658, or to the "set up" circuit, the line 657, so that these circuits are under separate and distinct control. The valve 660 is a directional control valve operated by the foot treadle 640 and the brake ratchet handle 630 controlling the flow to the motor 674 and the cylinder 612. The valve 660 also acts as an interlock between the motor 674 and the cylinder 612 preventing the motor 674 from operating while the cylinder 612 is extended and conversely prevents the cylinder 612 from being extended while the motor 674 is operating. The check valve 672 prevents the motor 674 from running or being driven backwards and, as can be seen from FIG. 50, the check valve 680 prevents the flow in lines 670 and 678 from bypassing the motor and going to the sump or tank 654. However the check valves 680 and 672 allow a recirculating type flow around the motor to prevent cavitation and permit adjustably controlled "coasting" of the motor 674.

The valve 682 is a balanced piston type maximum pressure valve combining with the pilot valve 686 which sets the maximum system pressure and wherein a balanced piston responds to the pilot valve to release excess fluid and thus limit exhaust pressure on the motor. Thus the valve 682 controls the re-circulating fluid around the motor 674.

The valve 698 is also a balanced piston-type maximum pressure valve combining a pilot valve 704 in the line 700 which sets the maximum system pressure. A balanced piston therein responds to the pilot valve to release excess fluid and thus limit the maximum pressure of the system. The valve 698 is used with a vent connection to the valve 702 and thus the valve 702 either blocks or unblocks the vent of the valve 698. The valve 698 functions at full system pressure when the vent is blocked. When the valve 702 is opened the pressure on the vent side of the balanced piston is regulated by the valve 704. With no pressure in the line 670, this unbalances the piston and reduces the system pressure to a pre-set lower value, for operation of the loading platform cylinder 612.

The valve 710 functions during the surging conditions of the motor 674 to allow the hydraulic fluid to pass uncontrolled into the pressure tank or accumulator 712, and also serves to meter fluid from the surge tank 712 back to the sump. The valve 686 is a pressure control valve used to control the exhaust flow from the motor 674 and prevent over-speeding of the motor. During out-of-balance operation, in connection with the valve 682, and the valve 710, and the accumulator 712, it functions as a governor. Control is initiated by any pressure variation on the inlet side of the motor 674.

In FIG. 51 the mechanical connection between the ratchet handle 630 and the linkage 638 is shown in more detail. The link 638 is connected at the pivot 720 to the cross shaft 722, supported transverse of the trailer bed. The shaft 722 has the adjustable crank arm 724 connected at the other end and pivotally attached to the adjustable linkage 726 controlling the mechanical brake 728. The brake 728 controls the drive sheave 492.

The clamp 730 is adapted to engage the shaft 722 and carries the crank arm 732 connected to the adjustable linkage 734 to the pin 736 and double crank 740 which is pivotally mounted through the bushing 742 on a shaft (not shown).

The foot treadle 640 (see also FIG. 48) is attached to the yoke member 744 which is pivoted by the bracket end 746 and the treadle is linked to the crank by means of the pivotally mounted connecting link 750. The crank 748 is affixed to the short cross shaft 752, suitably supported on bearing members (not shown) as is the shaft 722, and carriers the crank 754 at the other end. The crank 754 in turn is connected to the adjustable cable linkage 756, like linkage 734, and to the top or opposite pivot point 758 of the double crank 740. The double crank 740 has the intermediate pivot 760 connected to the adjustable vertical 762 which is pivotally connected to the motor spool (see FIG. 50) of the directional control valve 660.

The shaft 722 through the control handle 630 actuates the main motor drive for the drive sheave 492 and simultaneously releases the brake 728. The shaft 752 actuates the valve 660 when the foot treadle 640 is depressed. The linkage 756 pulls the link 762 down when the foot treadle is depressed. The cable linkage 756 forces the linkage 762 up when the shaft 722 is rotated clockwise by the handle 630.

It is thus seen that with the brake handle 630 in the "brake" position of FIG. 48 the cable linkage 734 is slack, causing the motor spool in the valve 660 to return to neutral. Only when these conditions exist can the treadle 640 be depressed, to tighten the cable linkage 756 and pull the linkage 762 down, and raise the loading platform 580. When the brake handle 630 is moved to the left in FIG. 48, the cable linkage 734 is tightened. This action pushes the linkage 762 up, causing the valve 660 to pass through the neutral position and allow the loading platform 580 to lower, the drive motor 674 is started by the handle 630 to turn the drive sheave 491 and safely rotate the wheel 30.

From this description it is seen that finite control of the hydraulic system is provided. With the motor 16 running and the valve 656 connected to the "operate" position as shown in FIG. 50, there is hydraulic flow through valve 660. By shifting the valve 660 to the No. 1 position the flow is directed to the motor 674 and through the line 690 to retract the loading platform cylinder 612. Fluid exhausted from the motor 674 is directed to one of these possible routes. First under normal conditions, the fluid flows through the valve 686 and to sump. Second under surging conditions, the fluid flows through the valve 710 and into the accumulator 712 and is then metered out by the valve 710 through the valve 686 to the sump. Third, during periods of "coasting" during which excessive pressures are relieved through the valve 682, that, after the fluid power to the motor 674 is stopped by the valve 660, the fluid leaving the motor 674 recirculates through the valve 682, through the check valve 680 and back through the motor to prevent cavitation.

Briefly the assembly steps of the wheel of this invitation, in the preferred sequence, comprise positioning of the trailer, starting the engine and turning the hydraulic system to "set up," extending the leveling legs at the front of the trailer, disconnecting the tractor, leveling the trailer, unwinding the winch cable and fanning the derrick wheel, removing the rear knee brace stowing pins, loosening the drive cable, positioning the wind brace feet and wind brace cross bars, removing the sway braces, raising the towers, attaching any guy cables, driving in the four knee brace pins, driving in the tower pins and taper keys, extending the diagonal wind braces and pin, removing the spoke clamping angles and any tie down chains, attaching the spoke tie cables to the rear knee brace pins, fanning the wheel, disconnecting the winch cable from the single tree, connecting the broken rims and parallel cables, removing the single tree, installing the rim pins and repositioning the driving rims, repositioning the last light panels, installing the hub pins and hub retainer rings, checking the trueness of the wheel, installing the drive cable, switching the hydraulic circuit to "operate" position, checking the tracking of the drive cable as the wheel turns, installing and locking the remaining seats, removing the seat covers, folding down the foot bottoms and folding out the steps and installing the hand rails.

It is apparent that some deviation from the foregoing steps can be used, however for efficiency in erecting the wheel, safety, and elimination of repetition of steps the foregoing procedure has been found to be preferred. Also some alterations in the structure of the parts can be made without departing from this invention. The trailer can be two wheel or four wheel. Electric winches can be used in place of hydraulic and the main drive means and lift means for the loading platform can be electric. Mechanical jacks can be used in place of hydraulic. The derrick wheel can have two spoke members or more than three such members. The light panels can be omitted as well as other lighting used on the stancheons and towers. The size of the wheel can be varied and a base other than a trailer can be used. The parts can be reversed front to rear on the trailer or other base means used. The direction of motion of the rotating parts can be reversed. It is contemplated that the wheel can be made of any suitable materials of construction, other than the tubular or angle iron parts illustrated, and the invention can be used wherever a collapsible wheel is required to carry a load or do work. Thus the invention can be used for a water wheel or other utilitarian or decorative purposes.

In operating the wheel for passenger amusement purposes it is best that it be maintained in a balanced condition. For example, a good procedure is to load seat No. 1, then seat No. 7, then No. 8, No. 2, No. 3, No. 9, No. 10, No. 4, etc., that is leave only one seat out of balance at a time. By using hydraulic drive system of FIG. 50 the wheel has a built-in anti-rollback feature.

Dismantling of the wheel is essentially the reverse of the assembly procedure with the exception that to start the wheel folding the No. 11 spoke is pulled by hand with some slack in the winch cable while the wheel is swung or rotated slightly. This is done with a little slack in the spoke tie cables. Each seat is hooked up just before reaching its folded position to be out of the way of the seat pins on the next spoke. When the wheel is folded, fastenings such as chains or cables are connected for pulling the towers off of dead center. The winch can be used for this purpose. Tabs may be provided on the single tree for this purpose.

What is claimed is:

1. A folding wheel and mounting therefor including
   (a) a pair of spaced tower members, said tower members being hinged at their bases to a support member,
   (b) an axle rotatably supported between said towers,
   (c) means for raising said towers on their hinged bases to an upright position,
   (d) hub members on said axle,
   (e) a foldable derrick wheel mounted on said axle between said hub members,
   (f) a series of paired cross braced spoke members connected at their outer ends between pairs by a series of hinged foldable rim members and connectable at their inner base ends to said hub members,
   (g) means adapting said spoke members to fold into a stack upon said support member with the top most spoke pair only affixed at the base end to said hub members, said stack being adapted to be unfolded and fan around said axle with said towers in a raised position by means of a pulling force on said top most spoke member over said unfolded derrick wheel, and
   (h) means to connect the inner ends of said spoke members to said hub members and the top most spoke member to the bottom most spoke member in the fanned out and adjacent position.

2. A folding wheel in accordance with claim 1 in which
   (a) said support member comprises a trailer.

3. A folding wheel in accordance with claim 1 including
   (a) means for locking said towers in said upright position,
   (b) knee braces pivotally attached to said towers for fore and aft stability, and
   (c) outrigger means extendable from said towers for lateral stability.

4. A folding wheel in accordance with claim 3 in which
   (a) said outrigger means comprises a pair of foldable side braces and a telescoping diagonal brace, said braces being adapted to extend from said support means and be attached to a hinged outrigger shoe, and
   (b) means on said shoe for adjusting and fixing the angle between said shoe and said braces.

5. A folding wheel in accordance with claim 1 in which
   (a) said means for raising said towers comprises a hydraulic jack member extendable from a retracted position in which said towers rest upon said support means to a position wherein said towers are upright, and including
   (b) knee braces to lock between an intermediate point on said towers and said support means whereby the pressure in said hydraulic jack member can be relieved.

6. A folding wheel in accordance with claim 1 in which
   (a) said hub members have peripheral radially spaced recesses with a bore hole extending transversely through each of said recesses,
   (b) said spoke members are provided with lobed base members adapted to fit within said recesses of said hub member, said lobed base members having a bore hole matching the bore hole in said hub members,
   (c) pin members adapted to engage said bore holes of said hub and base members with their heads on one side of said hub member,
   (d) a ring member adapted to engage against said heads of said pin members, and
   (e) means for releasably retaining said ring member thereagainst.

7. A folding wheel in accordance with claim 1 in which
   (a) said foldable derrick wheel comprises a series of spoke members having hub members frictionally engaging said axle and provided with cable guide member at the extended ends, and
   (b) a tie member attachable between each of said spoke members whereby the series is adapted to be fanned out and circumferentially tied thereby placing said cable guide members in fixed spaced circumferentially configuration.

8. A folding wheel in accordance with claim 7 in which
   (a) said spoke members of said derrick wheel comprise V-shaped spoke members carrying said cable guides at the outer apexes and having their hub members spaced from each other and common to a co-planar V-saped spoke member diametrically opposite thereto, said opposed spoke members being adapted to individually rotate upon said axle into a stacked folded condition with the cable guides of each V-shaped spoke on one side of the axle in juxtaposition with those of the next diametric pair,
   (b) said hub members frictionally engaging said axle, and
   (c) means for adjusting the engagement of said frictional hub members with said axle.

9. A folding wheel in accordance with claim 1 in which
   (a) said paired spoke members of said wheel have light panels extending diagonally between said cross braces in a design orientation, and
   (b) said light panels between adjacent spokes being pivotally mounted at one end and adapted to telescope as said spokes unfold into said wheel and fold into stacked arrangement.

10. A folding wheel in accordance with claim 9 in which the bases of said tower members have downstops adapted to adjustably engage said support member for finite alignment of the towers.

11. A folding wheel in accordance with claim 1 in which
    (a) a spoke rest is provided on said support member at the base of said towers for said paired spoke members in stacked condition, and
    (b) said support is provided with roller means engaging the bottom most of said spokes whereby to provide a friction-free pivot point for said stack as same is unfolded and folded to form said wheel.

12. A folding wheel in accordance with claim 1 including
    (a) circumferentially arranged drive cable guide means at the juncture of said rim and spoke members,
    (b) said cable guide means having a curved flanged surface substantially conforming to the curvature of said wheel, and
    (c) means to hold said cable guide means in folded position on one rim member and adapted to allow the rotation of said cable guide means into operable position to engage holding means on the next successive rim member whereby to be engageable by a drive cable for rotation of said unfolded wheel.

13. A folding wheel in accordance with claim 1 adapted for amusement purposes including
    (a) passenger seats pivotally mounted from seat pins at the periphery of said wheel and having foot rests,
    (b) a passenger loading platform on said support member,
    (c) said platform being pivotally mounted and having a treadway engageable with said foot rests of said seats in one position to stabilize same for entry of passengers and being pivotable out of engagement with said foot rests in a second position, (d) drive means for said wheel and control means for said drive means and said loading platform, (e) said control means adapted to allow the operation of said drive means only where said loading platform is retracted and allow the extension of said loading platform only when said drive means is stopped.

14. A folding amusement wheel in accordance with claim 13 in which (a) said loading platform is hingeably mounted at one end and mounted to a linkage at the other end, and (b) hydraulic means are provided to move said linkage to a past center position in the extended condition of said platform whereby said linkage supports any passenger weight.

15. A portable ferris wheel is accordance with claim 13 wherein said control means includes (a) a source of hydraulic power in a hydraulic system with a sump return, (b) means to control flow of hydraulic power to an operate circuit and a set up circuit in said system, (c) said operate circuit including a cylinder controlling said passenger loading platform and a hydraulic drive motor for said wheel, (d) a direction control valve in said operate circuit operable in one position to extend said cylinder, raise said platform, and close fluid flow to said motor, and in a second position to retract said cylinder, lower said platform and open fluid flow to said motor, (e) brake means on said wheel, and (f) means to operate said direction control valve for movement to said first position only when said brake is applied.

16. A ferris wheel in accordance with claim 15 in which (a) said means to operate said direction control valve in said one position comprises a foot treadle, (b) lever means are provided to operate said brake means, and (c) a linkage is provided between said lever means and said treadle whereby the latter is operable only in the braking position of the former.

17. A portable folding ferris wheel comprising (a) a trailer having an elongated flat bed with a prime mover connected to a hydraulic drive motor operating a rotatable drive sheave thereon, (b) a folding step at the rear end of said trailer for admission of passengers, (c) a pair of towers hinged at their bases to said trailer bed intermediate the ends of the trailer, said towers rotatably supporting a main axle therebetween, (d) said towers being adapted to pivot backwardly from a folded down position on said trailer to an upright position, (e) forward stancheons to receive and support said towers in the folded down position, (f) jack means connected between said bed and an intermediate point on each of said towers to simultaneously raise said towers to said upright position, (g) a pair of fore knee braces pivotally connected between said bed and another intermediate point on said towers, said knee braces being hinged intermediate their ends so as to fold down with said towers, (h) a pair of aft knee braces pivotally connected between another intermediate point on said towers and having shoe members at the other ends with a cross bore therethrough, (i) a pair of elongated guide cleats on said bed aligned with said aft knee braces and adapted to slidably receive said shoes as said towers are raised, said cleats having a stop member corresponding to the upright position of said towers and a cross bore registering with the cross bore of said shoes whereby to pin lock said aft knee braces, (j) a pair of guy cables affixed between said towers and said bed on each side of said trailer in fore and aft positions and having shock absorber means diagonally affixed between a lower part of said cables and said bed, (k) means to affix said towers to their bases in upright position, (l) a pair of hub members carried on said axle, said hub members having peripheral recesses with transverse bore holes intersecting each recess, (m) a derrick wheel supported on said axle between said hub members, said derrick wheel comprising at least a pair of diametric spoke members having central hubs frictionally engaging said axle and having cable guide means at their extended ends, said members being adapted to individually pivot on said shaft to a folded position and having flexible tie means between their extended ends attachable to maintain said spoke members in a fanned radial position with the cable guide means circumferentially aligned about said axle, (n) a foldable ferris wheel between said towers comprising a plurality of cross-braced spoke pairs having lobed base members at their hub ends with a cross bore therein receivable in the recesses of said hub members whereby to pin lock therein, the lobed base members of the first to last spoke pairs being hinged to each other, (o) said spoke pairs being arranged in a substantially vertical stacked position longitudinally between said towers in folded position with the lobed base of the top most spoke pair pinned within opposite recesses of said hub members and the remaining bases disconnected from said hub members, and with their lobed bases off-set one from the other, (p) a pair of spoke rests on said trailer bed and having channeled top members to receive the outer end of said bottom most spoke pair in the stacked position, (q) a roller in the channels of said spoke rest to support said stack of spoke pairs for limited fore and aft movement thereon, (r) folding rim members pivotally mounted at their ends between the outer ends of successive spoke pairs, said rim members having bore holes matching through the ends of said spoke pairs whereby to pin lock same in unfolded position, the rim members between the top most and bottom most of said spoke pairs being detachable at one end from one of these spoke pairs to allow the unfolding of said wheel, (s) each of said spoke pairs having an inwardly extending seat pin at the outer end thereof, (t) passenger seats carried by and locked to said seat pins at predetermined peripheral distances with one or more intervening spokes therebetween so as to be in a balanced relationship in the initial unfolded position of the wheel, (u) drive rims pivotally mounted on said rim members and adapted to be reverse folded and affixed thereto in the folded position of the wheel and unfolded and affixed in the unfolded position of the wheel with their outer cable receiving surfaces circumferentially spaced thereabout, and offset to receive an incoming drive cable therefor, (v) a single tree adapted to lock upon the opposite seat pins of a spoke pair and used during unfolding and folding of said wheel by attachment to the top most spoke pair in the stack, (w) a winch having a winch cable, driven by said prime mover, said cable being adapted to engage around the cable shoes of said derrick wheel for attachment to said single tree, and (x) locking pin means for engaging said rim members, said detachable rim members, said drive rims and said hub members to the respective ends of said spoke pairs whereby said ferris wheel is adapted to be unfolded from its stacked position by attachment of said winch cable over said derrick wheel to said single tree and pulling the top most spoke from the next spoke about said axle as a fulcrum thereby simultaneously unfolding said rim members therebetween, and sequentially unfolding the stack of spoke pairs around said hub, wherein each base member of the succeeding spoke pairs mates with the corresponding and next adjacent recesses in the hub members on each side thereof to be pin locked therein.

18. A ferris wheel in accordance with claim 17 in which
  (a) said lobed base members on the inner hub ends of said spoke pairs in the series have hinge plates therebetween, said hinge plates being pivotally attached to the base members of one of said spoke pairs and non-rotatably affixed to the adjacent spoke pair throughout the series of spokes on each inner ends thereof whereby, as the upper spoke pair is lifted the adjacent base members hinge thereupon away from each other a radial distance sufficient for all of the base members to sequentially engage within the recesses of the hub and be pin locked therein.

19. A ferris wheel in accordance with claim 17 in which
  (a) headed pins are provided for insertion from one side into and through the registered bore holes of said lobed base members and said recesses in said hub members to lock said base members of said spoke pairs in each hub member,
  (b) said hub members being provided on each of said sides with radially spaced studs having a spring load washer thereon, and
  (c) a retainer ring is provided and adapted to circumferentially engage against the heads of said headed pins, said ring having spaced apertures with intersecting slots, said apertures being adapted to fit over said studs against said spring loaded washers and be turned thereagainst with the slots engaging under said head whereby said pins are retained in said hub.

20. A portable folding ferris wheel in accordance with claim 17 including
  (a) elongated light panels pivotally attached at one end to the outer cross braces of said spoke pairs within said wheel,
  (b) said light panels having channels on the other ends,
  (c) spaced links on inner cross braces of said spoke pairs having rollers thereon engageable with the channels of said light panels whereby said light panels are adapted to forshorten upon folding of said wheel and lengthen upon unfolding of said wheel to accommodate the variations in circumferential spacing of said inner and outer cross bars.

21. A portable folding ferris wheel in accordance with claim 20 in which
  (a) the light panels on the cross bars of the bottom most spoke pair are detachably mounted at the outer cross braces whereby said panels are adapted to be linked to the outer cross braces of the top most spoke pair in the fanned position of said wheel.

22. A portable folding ferris wheel in accordance with claim 17 including
  (a) a hydraulic drive means to rotate said wheel and brake means,
  (b) and a loading platform with means to raise said platform operable only when said drive means is stopped and said brake means applied.

23. A portable folding ferris wheel in accordance with claim 17 in which
  (a) said rim members are hinged so as to fold inwardly between each adjacent spoke of said ferris wheel with their tenons staggered,
  (b) said rim members on each side of the individual spoke members pivoting to a position against the outside of each spoke member, and
  (c) a roller member adapted to engage between said spoke and said rim members upon a guide cleat therebetween to allow said overlap during folding of said wheel.

24. A portable folding ferris wheel in accordance with claim 17 in which
  (a) said trailer includes levelling legs adapted to engage the ground surface and stabilize said trailer,
  (b) each of said levelling legs operating within a housing an aperture therethrough, with a clamp retainer plate,
  (c) a split collar encompassing said levelling leg and having radially extending spaced ears at said split, said ears extending through the apertures of said housing, and
  (d) means for clamping said ears of said split collar together to tighten said collar about said legs whereby said legs are locked in said housing, and supported on said clamp retainer plate.

25. A portable folding ferris wheel in accordance with claim 17 including
  (a) outrigger means extendable from the sides of said trailer to the ground for lateral stability,
  (b) said outrigger means including a diagonal wind brace,
  (c) said wind brace comprising telescoping hollow members one of which is pivotally mounted to the side of each of said towers,
  (d) a series of equally spaced cross bores through one of said hollow members,
  (e) a series of closer spaced cross bores through the other of said hollow members,
  (f) at least a pair of said series of cross bores registering as a vernier with one another through said outrigger means in an extended position whereby to be pinned and locked together.

26. A portable folding ferris wheel in accordance with claim 25 in which
  (a) the outer telescoping members of said wind braces are pivotally mounted to said towers, and
  (b) the inner member is suspended from a counter balance therein.

27. A portable folding ferris wheel in accordance with claim 25 in which
  (a) an outrigger shoe is provided adapted to attach to the end of said outrigger means,
  (b) said shoe having a flat bottom and a bracket member hingeably attached at one end of the shoe,
  (c) a vertical threaded bore in said bracket member to receive an adjusting bolt the bottom end of which engages against the shoe at a point spaced from the hinge of said bracket,
  (d) said outrigger means being pivotally mounted to said bracket between said hinge and said adjusting bolt, and
  (e) a swivel base on said bolt engageable against said shoe.

28. The method of erecting a hydraulically-operated folding ferris wheel which comprises
  (a) positioning and levelling said wheel in folded condition,
  (b) fanning out a derrick wheel supported on an axle between folded towers thereon,
  (c) hydraulically raising said towers and derrick wheel to an upright and locked position,
  (d) extending outriggers to stabilize said wheel laterally,
  (e) affixing wind braces from the towers to the ends of the outriggers,
  (f) extending a line from a winch over said derrick wheel and affixing the end to the top most pair of spokes of the folded wheel, (g) withdrawing said line onto said winch to thereby lift said pairs of spokes pair by pair off said folded wheel, (h) straightening and locking folding rim members between each spoke in the series, and attaching the top most spoke to the last spoke in the series, (i) engaging and locking knee braces to said towers, (j) repositioning driving rims at the ends of the spokes of the fanned wheel, (k) affixing the inner ends of the spokes to the axle, (l) installing a drive cable around the drive rims, and (m) installing and locking seats between the ends of the pairs of spokes of the wheel.

References Cited
UNITED STATES PATENTS 3,002,753   10/1961   Garbrick   272—29
3,222,061   12/1965   Eyerly et al.   272—29

ANTON O. OECHSLE, Primary Examiner

A. W. KRAMER, Assistant Examiner